(12) United States Patent
Vanderelli et al.

(10) Patent No.: US 8,138,696 B2
(45) Date of Patent: Mar. 20, 2012

(54) DIPOLAR AXIAL COMPRESSION PERMANENT MAGNET MOTOR

(75) Inventors: Timm A. Vanderelli, Ligonier, PA (US); Rodney Carter, Buchanan, TN (US)

(73) Assignee: Kress Motors, LLC, Ligonier, PA (US)

( * ) Notice: Subject to any disclaimer, the term of this patent is extended or adjusted under 35 U.S.C. 154(b) by 0 days.

(21) Appl. No.: 12/975,652

(22) Filed: Dec. 22, 2010

(65) Prior Publication Data

US 2011/0089872 A1      Apr. 21, 2011

Related U.S. Application Data

(60) Provisional application No. 61/288,938, filed on Dec. 22, 2009, provisional application No. 61/332,956, filed on May 10, 2010.

(51) Int. Cl.
*H02K 47/14* (2006.01)
*H02K 29/00* (2006.01)
*H02P 8/14* (2006.01)

(52) U.S. Cl. ......... 318/140; 318/492; 318/538; 310/113

(58) Field of Classification Search .......... 318/375–382, 318/140, 148, 151, 153, 459, 491, 492, 538; 310/12, 13, 185, 112–114, 152, 102 R, 46, 310/48, 156.01, 156.43, 266, 268, 156.32, 310/156.35

See application file for complete search history.

(56) References Cited

U.S. PATENT DOCUMENTS

| | | | |
|---|---|---|---|
| 4,584,506 A * | 4/1986 | Kaszmann | 318/400.26 |
| 4,761,590 A * | 8/1988 | Kaszman | 318/400.26 |
| 5,227,702 A * | 7/1993 | Nahirney | 318/400.41 |
| 5,258,697 A | 11/1993 | Ford et al. | |
| 5,514,923 A * | 5/1996 | Gossler et al. | 310/74 |
| 5,696,419 A | 12/1997 | Rakestraw et al. | |
| 5,925,958 A * | 7/1999 | Pirc | 310/152 |
| 6,169,343 B1 * | 1/2001 | Rich, Sr. | 310/15 |
| 6,392,370 B1 * | 5/2002 | Bedini | 318/140 |
| 6,462,491 B1 * | 10/2002 | Iijima et al. | 318/400.34 |
| 7,109,671 B2 * | 9/2006 | Bedini | 318/140 |
| 7,230,358 B2 | 6/2007 | Smith | |
| 7,400,069 B2 * | 7/2008 | Kundel | 310/20 |
| 7,564,208 B2 | 7/2009 | Bailey et al. | |
| 7,898,229 B2 * | 3/2011 | Babcock et al. | 323/225 |
| 2002/0097013 A1 * | 7/2002 | Bedini | 318/139 |
| 2006/0038456 A1 * | 2/2006 | Bojiuc | 310/156.32 |
| 2009/0045690 A1 | 2/2009 | Kerlin | |
| 2009/0085511 A1 * | 4/2009 | Meinke et al. | 318/818 |
| 2010/0196185 A1 * | 8/2010 | Higuchi et al. | 418/59 |
| 2010/0237729 A1 * | 9/2010 | Lawson | 310/80 |
| 2011/0025067 A1 * | 2/2011 | Cipriani | 290/52 |
| 2011/0109185 A1 * | 5/2011 | Sullivan et al. | 310/156.35 |

* cited by examiner

FOREIGN PATENT DOCUMENTS

WO    0151239    7/2001

*Primary Examiner* — Eduardo Colon Santana
(74) *Attorney, Agent, or Firm* — Alicia M. Passerin, Esq.; Pietragallo Gordon Alfano Bosick & Raspanti, LLP

(57) ABSTRACT

The present invention relates to a system and a method for improving the use of energy in an electric motor by inducing currents generated from magnets that result in an increase of primary power and creating, directing and introducing a counter current obtained from primary coils of the motor into a resonant LC circuit which is introduced as a transient secondary process to increase the overall efficiency of the motor. Furthermore, this motor produces rotational torque without using alternating magnet polarity, but rather magnetic compression that utilizes permanent magnets arranged in a dipolar manner around an axial plane.

8 Claims, 23 Drawing Sheets

DIPOLAR AXIAL COMPRESSION PERMANENT MAGNET MOTOR

BACKGROUND OF THE INVENTION

Numerous attempts have been made to increase the efficiency of electric motors. Many of these attempts are set forth in patents and patent applications such as:

U.S. Pat. No. 6,392,370, Bedini, Device and Method of a back EMF permanent electromagnetic motor.

U.S. Pat. No. 7,230,358, Smith, DC Resonance Motor.

US Patent Application 2009/0045690, Kerlin, DC Homopolar Motor/Generator.

SUMMARY OF THE INVENTION

The present invention comprises a dipolar magnetic compression motor which includes primary coils that produce currents which are directed through an LC circuit in timed resonance for use in increasing the efficiency of the motor. This current is switched on and off through a secondary set of coils without the need to be stored. In another embodiment, an induced current from magnets which pass within close proximity to the primary coils is directed to a power source and introduced into a set of secondary coils. The motor creates rotational torque as a direct result of these magnets being repelled by both primary and secondary coils arranged in a dipolar axial manner.

Generally, motors of the present invention comprise a housing supporting a rotatable shaft and at least one nonferrous rotor disk mounted to the shaft for rotation therewith. At least two permanent spaced apart magnets are mounted through the rotor with like poles aligned parallel to the shaft. A cylindrical support member is concentrically positioned around the rotor to support ferrous-cored coils. At least two ferrous cored coils are spaced apart from each other and mounted to the cylindrical support member in juxtaposed relationship to the permanent magnets on the rotor during rotation of the shaft. A timing wheel is positioned on the shaft adjacent to the support member. Additionally, a Hall effect device is fixed in a position so as to be influenced by the timing wheel.

A control circuit is provided for controlling current to respective coils when activated by the Hall effect device. A circuit is also provided for receiving current from at least one of the coils during rotation of the rotor when at least one coil is not directing current to that coil. The current received is directed to the control circuit for application to at least one of said other coils. By directing current generated from the unactivated coils to the activated coils, substantial efficiencies are created which results in the less production of heat in the motors of the present invention.

The dipolar magnetic compression comprises a pair of permanent magnetic poles of opposite polarity which are separated by a pre-determined distance move within close proximity to a pair of intermittently activated electromagnetic poles aligned in opposite polarity separated by a pre-determined distance. These permanent magnetic dipoles and intermittently activated electromagnetic dipoles are aligned with the same polarity, so their fields repel each other when electromagnetic dipoles are activated.

As a magnetic dipole approaches an un-activated electromagnetic dipole, impedance drops in direct proportion to the square of the distance between the magnetic and the electromagnetic dipoles. Currents are induced from the interaction between said magnetic dipole and said un-activated electromagnetic dipole, of which are held within electromagnetic dipole for a time period determined by the time constant formed by a reactive LC circuit comprised of the electromagnetic dipole's inductance and a fixed capacitance.

When impedance reaches a minimum value, un-activated electromagnetic dipoles are activated at a time and for a duration pre-determined with a control circuit triggered by a Hall effect device. Once activated, primary currents combine with currents held within reactive LC circuit, thus repelling magnetic dipoles. Impedance rises in direct proportion to the square of the distance between the magnetic and the electromagnetic dipoles and return to an un-activated value as the magnetic dipole exits.

In one embodiment of the invention, for example, current from the unactivated coils is used to increase the efficiency of the motor by directing and filtering it into a specifically calculated point of resonance. In this embodiment, the circuits direct and switch the current into and out of a secondary circuit. The capacitance in this circuit, when combined with the primary coils' inductance, is selected for a specific time constant to provide maximum current for the introduction into the secondary circuit. The secondary circuit includes a) magnet position sensor and b) a pulse switching-driver stage. In another embodiment, digital pulse conditioning is accomplished by the addition of c) pulse position control and d) pulse width control. Each of these stages is optimized to achieve the desired resonance of a tuned LC circuit.

As a consequence of directing and introducing the generated current into a secondary circuit, a lower amount of heat is generated in a motor employing the present invention. Optimum performance is governed by the selection of component values that achieve a resonant state between the capacitors and coils at a predetermined rpm having a desired torque.

The present invention achieves dipolar operation by positioning magnets of the same polarity facing the respective stator (coils). Pulsed electromagnetic fields are arranged to compress the magnets' north and south fields simultaneously, resulting in continuous rotation rather than the typical "push/pull" or alternating field arrangement of conventional bipolar motors.

Accordingly, with the same or less input power, the present invention utilizes dipolar axial compression together with the counter-electromotive force current (herein referred to as "CEMF") to provide greater torque and efficiency. In a preferred embodiment of the invention, a coil 'core' is made from laminated electrical steel to increase the flux density of the magnetic field. Other 'core' types such as grain oriented steels and ferro-composites are contemplated for use to further increase overall efficiency.

Various advantages of the motors of the present invention include:

A secondary circuit utilizes induced current spikes to provide time to use the current generated rather than produce heat. For example a 12 volt direct current input results in an induced voltage of about 200 volts, which is reduced to 12 volts under load.

These motors of the present invention can be made of non-metalic component parts which can reduce weight and electrical shock hazard. In one preferred embodiment of the invention, ultra high molecular weight (UHMW) plastics are used for the stators and rotor parts.

Increased energy efficiency achieved by introducing CEMF as a secondary process.

Lower operating temperatures which extend bearing and coil life.

DESCRIPTION OF THE FIGURES

FIGS. 16 through 18 are isometric views of the dipolar compression motor shown in FIG. 15 wherein FIG. 16 is an exploded view of the assembly;

DESCRIPTION OF THE INVENTION

Figure 1:
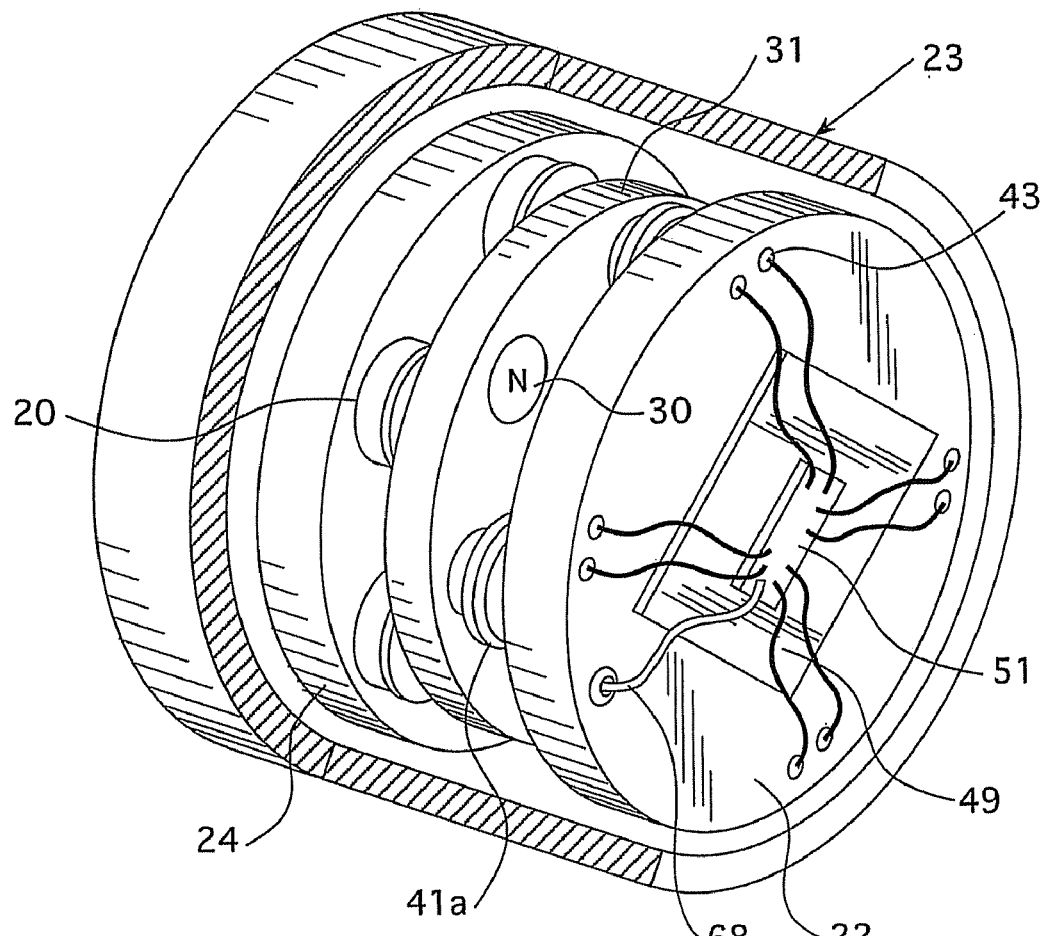
FIG. 1 is an exploded schematic view of the coil magnet interface of the stators and rotor of a basic dipolar compression motor of the present invention.
Figure 2:
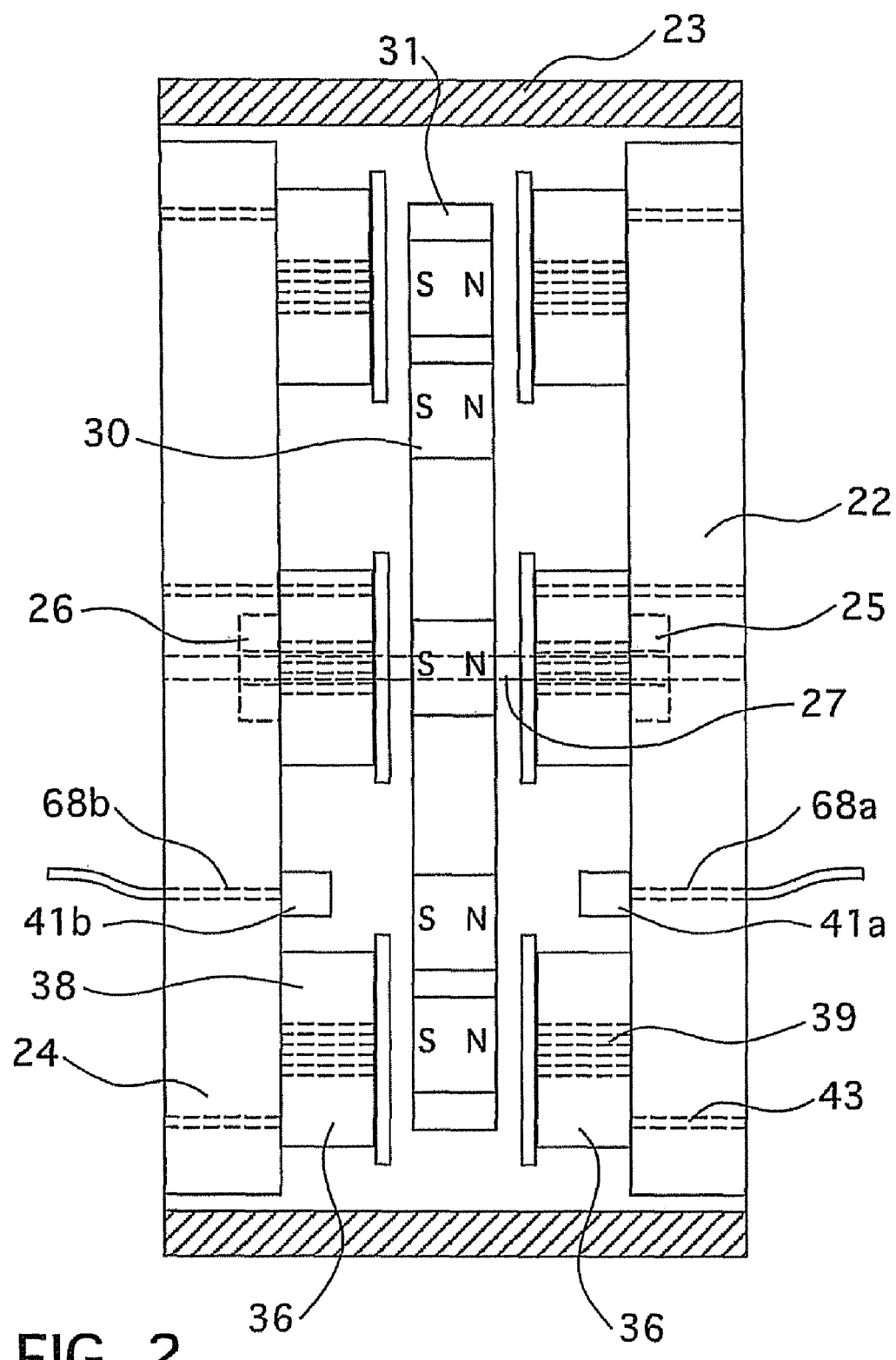
FIG. 2 is a basic dipolar compression schematic diagram of the motor depicted in FIG. 1.

Referring to FIGS. 1 and 2, a simplified embodiment of dipolar dc motor of the present invention is shown. A first stator plate 22 is affixed to one end of housing 23. Housing 23 is preferably made from a plastic such as a PVC plastic. A second stator plate 24 is affixed to the opposite end of housing 23, but facing first stator plate 22. A first bearing 25 and a second bearing 26 are centrally positioned on first and second stator plates 22 and 24, respectively, to provide support and a low friction surface for shaft 27. First and second bearings 25 and 26 are aligned to be flush with the respective inner edges of first and second stator plates. In this embodiment, a rotor 31 is mounted on shaft 27 for rotation and spaced apart from first and second stator plates 22 and 24. Rotor 31 is made from a nonferrous material, preferably UHMW plastic. Rotor 31 includes eight nickel-plated Neodymium cylinder magnets 30 are pressed into eight equi-spaced openings near the outer the circumference of rotor 31. Magnets 30 are aligned with their magnetic polarities parallel to shaft 27. Rotor 31 is affixed to shaft 27 by a rotor fixing ring (not shown).

In this embodiment, four coils 36 are used. Each coil is preferably fabricated from a pre-determined length of hard-drawn copper enameled #22 wire and tightly and evenly distributed around a nylon bobbin 38 utilizing an increased magnetic permeability from laminated iron cores 39 consisting of three hundred 1.500" long by 0.0015" diameter strands of welding wire. Laminated iron cores 39 are centrally and fixedly located within coils 36.

Coils 36 are mounted substantially equidistant around the circumference of first stator plate 22 and second stator plate 24 both stator plates facing towards magnets 30 mounted through rotor 31 such that the magnetic poles are in direct alignment with magnetic poles coils 36. Electrical connections to first and second coils 36 are made by way of coil pins passing through openings in the first and second stator plates 43.

A first semiconductor Hall device 41a is mounted on the inner side of the stator and positioned to face rotor 31 to sense the position of each magnet as it passes within close proximity to Hall sensor 41a during rotation of rotor 31. Supply voltage and signal output of first Hall sensor 41a are made by way of Hall cable 68a (FIG. 2) passing through first stator plate 22, then into first circuit board 49 and first socket connector 51.

Additionally, referring to FIG. 2, a second equidistant arrangement of four coils 36 are mounted on second stator plate 26 facing magnets 30 on rotor 31. This second set is also in direct alignment along a parallel plane with first stator plate and facing the magnets with an opposite set of magnetic poles. The second set of coils has electrical connections made in an identical to those in the first set of coils. A second identical semiconductor Hall device 41b is positioned to face rotor 31 for sensing the position of the magnets as they pass within close proximity to second Hall sensor 41b during rotation of rotor 31. Second Hall device 41b likewise mounted on the second stator plate with a supply voltage and signal output of second Hall sensor is supplied by way of a Hall device cable 68b (see FIG. 2) identical to the first Hall cable.

In a presently preferred embodiment of the foregoing motor, a Darlington controller was used in the operation of the motor employing CEMF.

Figure 14A:
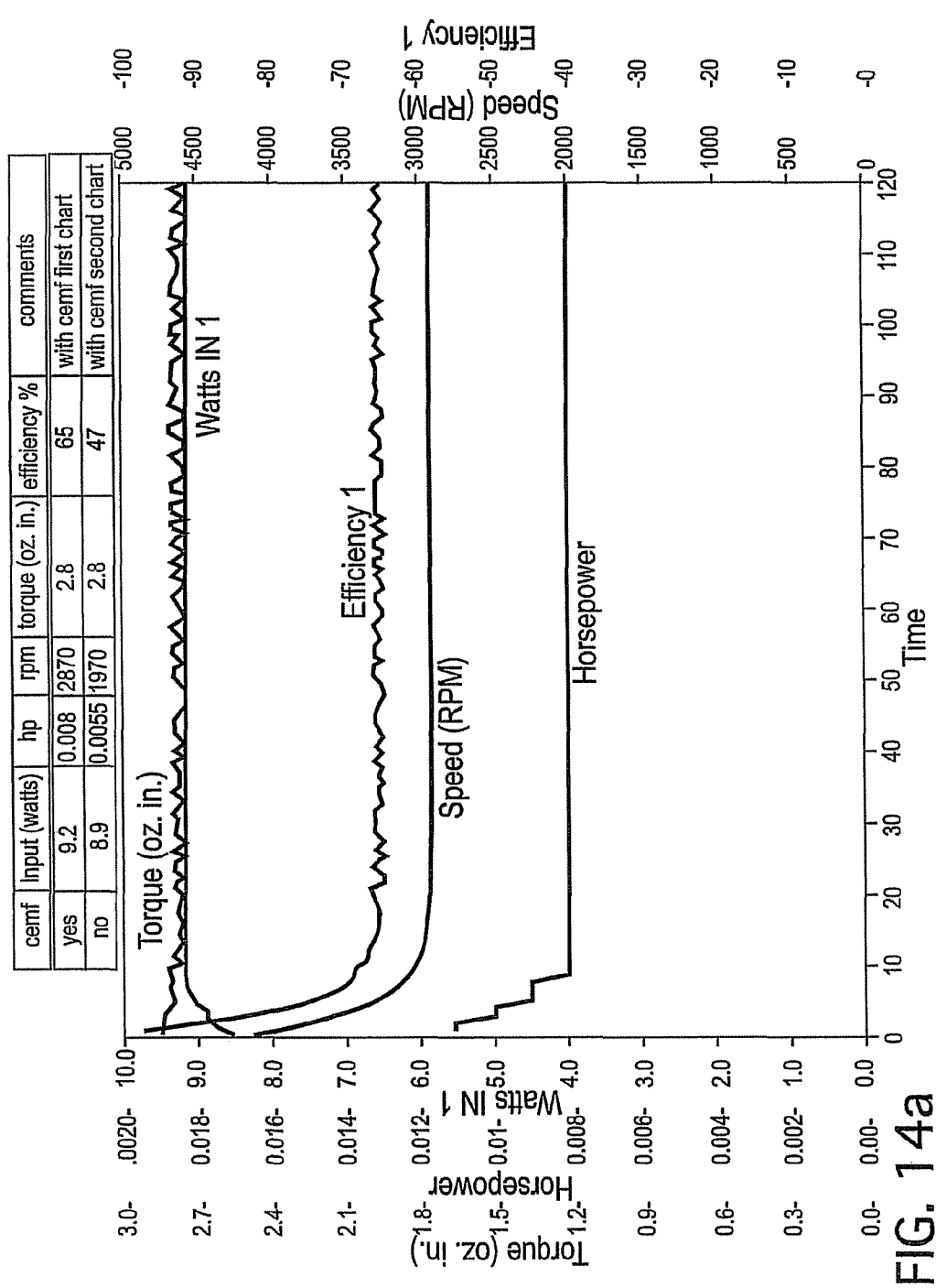
FIGS. 14a and 14b are graphical comparisons of the motor of the present invention using counter electromotive force in the graph 14a and the same motor not using such counter electromotive force in the graph 14b.
Figure 14B:
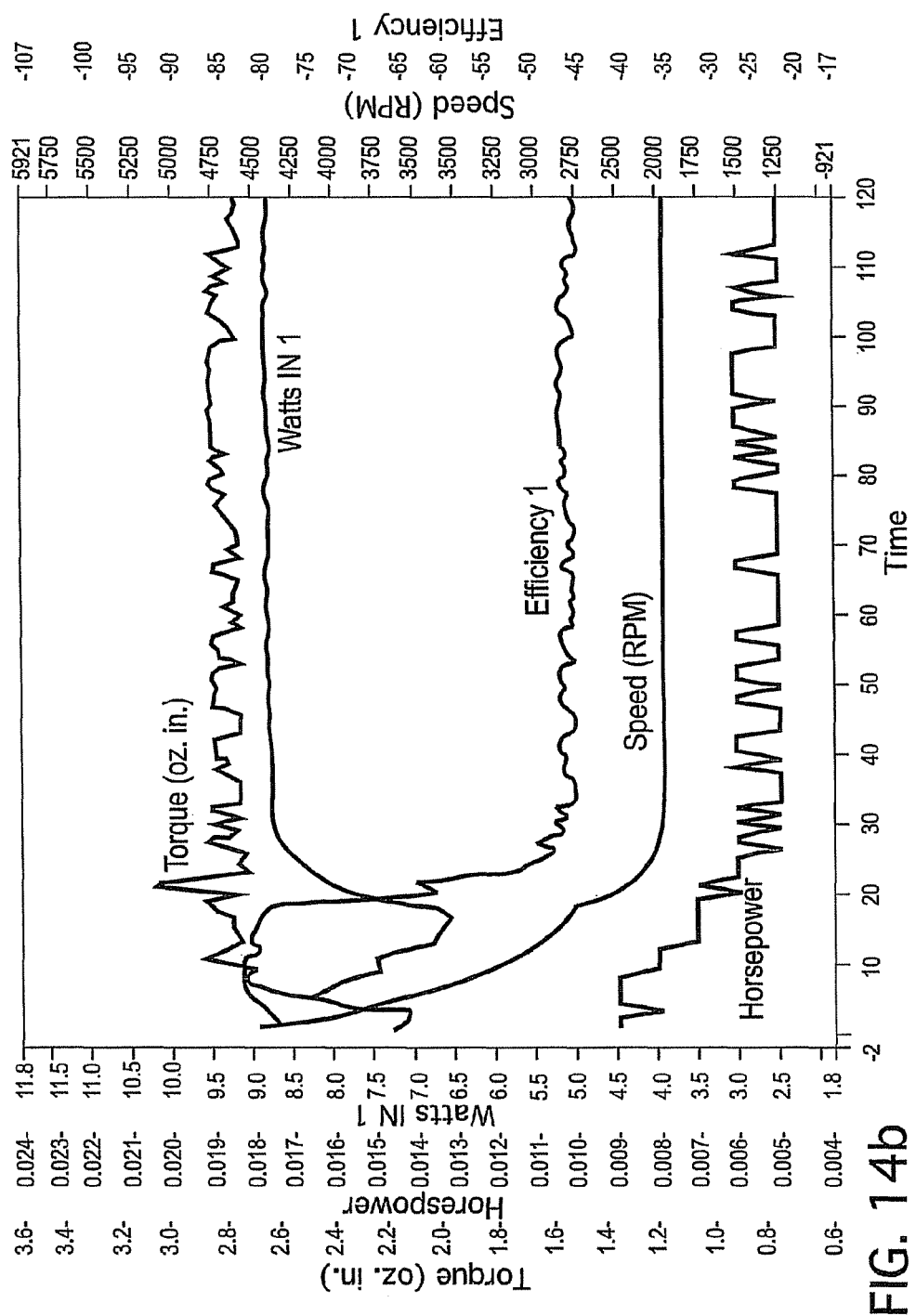

Referring to FIG. 1, the motor in this configuration reached a peak rotational speed of 3399 RPM and consumed 29.74 Watts of power. Both primary and secondary circuits were active in this test using CEMF which was obtained from the primary resonant transient filter circuit C1 and R1 (FIG. 3) and which is described in more detail below. In a comparison test using the Darlington Controller with and without using CEMF, a difference of 5.23 Watts was observed. (see FIG. 14a.) Also observed was an increase of 459 RPM by utilizing CEMF.

Figure 2A:
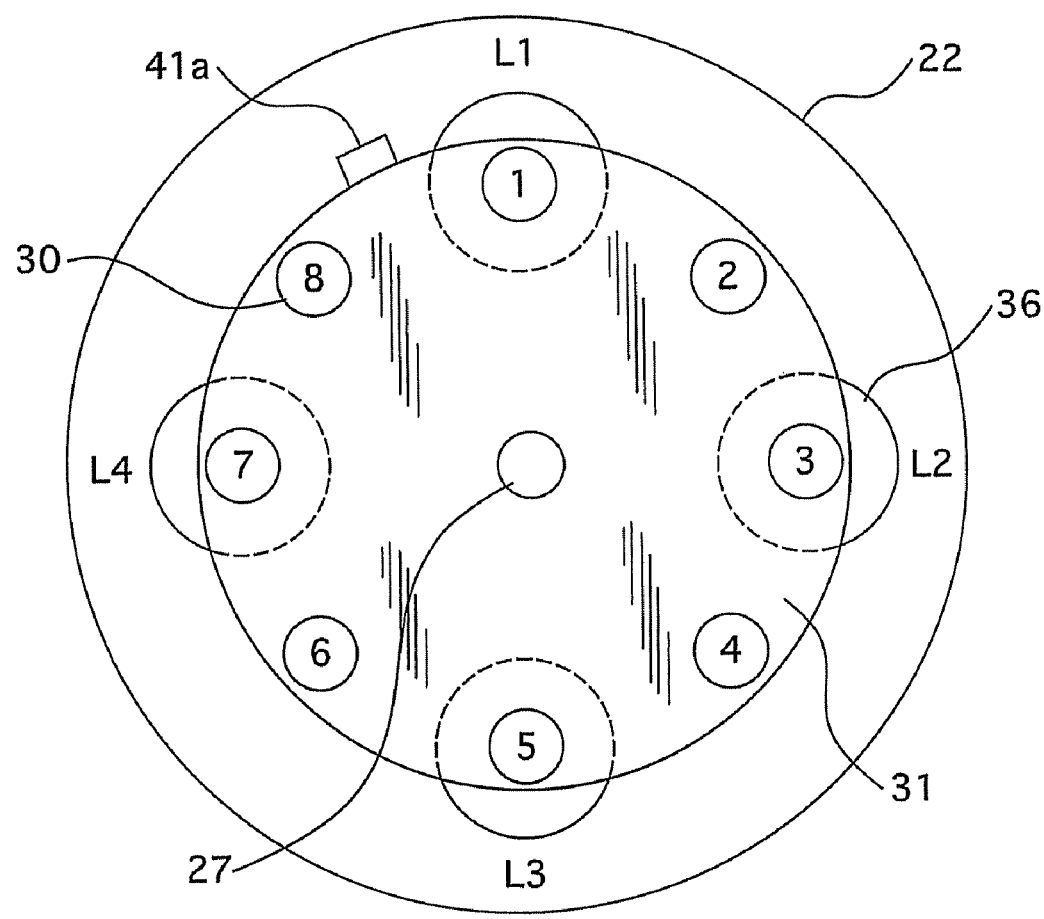
FIG. 2a is a diagram of the coil magnet interface showing successive magnet positions within FIGS. 1 and 2.
Figure 3:
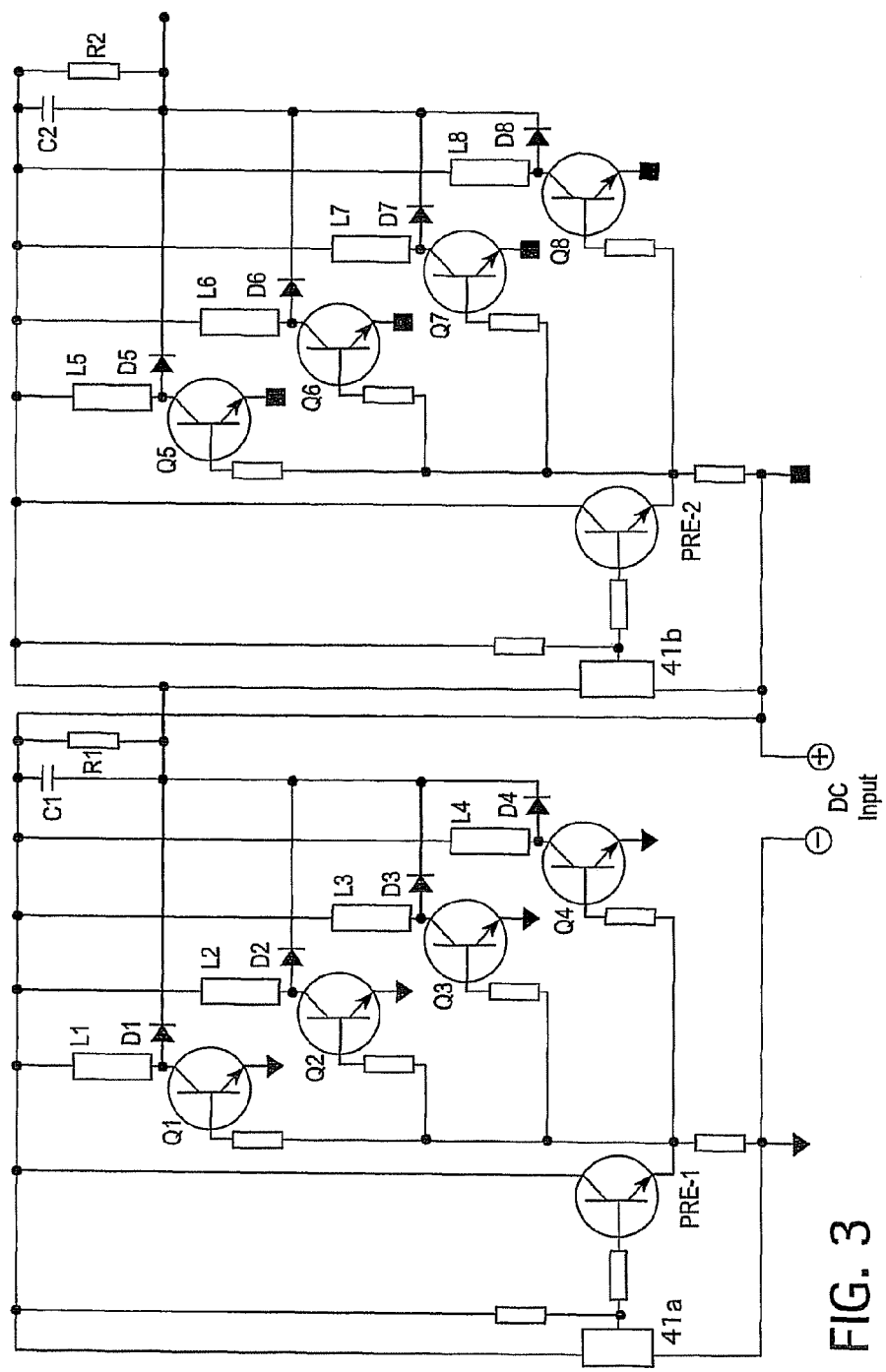
FIG. 3 is a schematic diagram of a control for the motor shown in FIGS. 1 and 2 using a Darlington control circuit.
Figure 4:
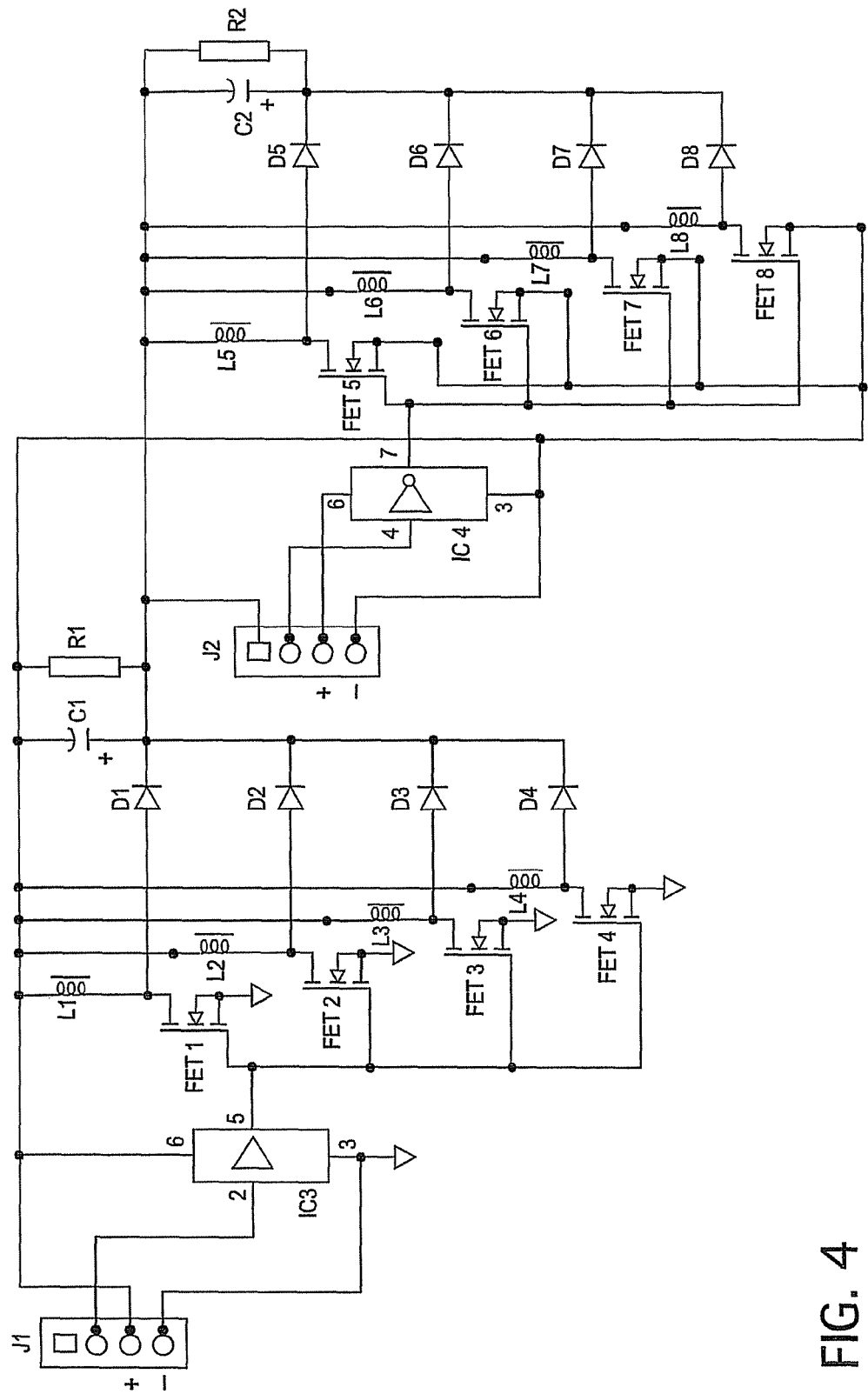
FIG. 4 is a schematic diagram of a Field Effect Transistor (FET) driver circuit dc motor of the present invention.
Figure 5:
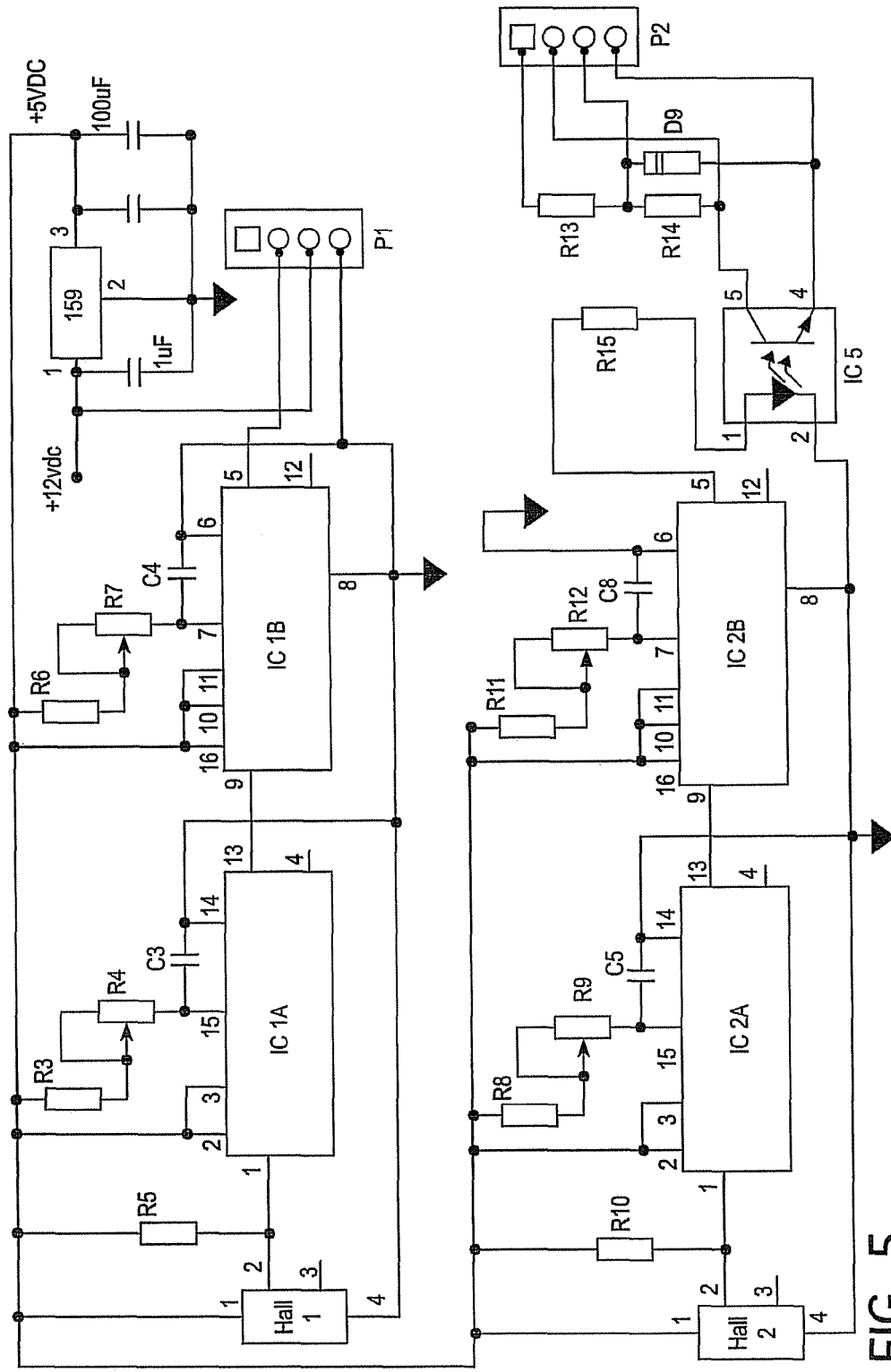
FIG. 5 is a schematic diagram of a regulating and pulse conditioning circuit used in conjunction with the control circuit shown in FIG. 4.

A brief description of the Darlington circuit shown in connection with FIG. 3 as used with the embodiment shown in FIGS. 1, 2 and 2a follows. In this Figure, primary coils 36 are shown individually as coils L1 through L4 mounted on stator plate 22 within close proximity to rotor magnets 30. The north poles of rotor magnets 30 come within close proximity to Hall device 41a during rotation and triggers pre-driver transistor 1.

Pre-driver transistor 1 turns on and triggers driver transistors Q1 through Q4, which actuate coils L1 through L4 to pass current simultaneously through each. Current flow through the coils creates an electromagnetic field of the same polarity of magnets. Magnets 1, 3, 5 and 7 (FIG. 2a) respond by repelling from coils L1 through L4 in a direction determined by their wiring polarities.

The cycle repeats when the north pole of the second rotor magnet comes in close proximity to hall device 41a, and continues as each successive north pole of the rotor's magnet comes in close proximity to hall device 41a.

During periods of time when Hall device 41a is not influenced by the north pole of any rotor's magnet, the electromagnetic field around each coil L1 through L4 collapses and produces a combined counter-electromagnetic force (CEMF) that is directed by rectifiers D1 through D4 into a transient filter composed of C1 and R1.

The combined inductance of coils L1 through L4, transient filter C1 and R1 create a LCR resonant circuit. Transient CEMF is directed into the secondary driver circuit providing power for Hall device 41b, pre-driver transistor 2, driver transistors Q5 through Q8 and coils L5 through L8. In a complimentary and opposing manner, but not shown, secondary coils L5 through L8 are mounted within close proximity to every other rotor magnet, but in opposition to primary coils L1 through L4. The south poles of the rotor magnet comes within close proximity to Hall device 41b and triggers pre-driver transistor 2. Pre-driver transistor 2 turns on, triggering driver transistors Q5 through Q8, which actuate coils L5 through L8, and pass current simultaneously. Current flow through the coils creates an electromagnetic field of the same polarity as the magnets. FIG. 2a. Magnets 1, 3, 5 and 7 respond by repelling away from coils L5 through L8 in a direction determined by their wiring polarities. The cycle repeats when the south pole of the second rotor magnet comes into close proximity of hall device 41b, and continues as each successive magnet's south pole comes within close proximity to hall device 41b.

During periods of time when Hall device 41b is not influenced by any magnet's south pole, the electromagnetic field around coils L5 through L8 collapse and produce a combined counter-electromagnetic force (CEMF) that is directed by rectifiers D5 through D8 into a transient filter composed of C2 and R2. The resultant CEMF from the secondary stage remains within the circuit, but was not reintroduced in this configuration.

Additionally, as each rotor magnet approaches each respective coil, currents are induced into each coil during driver 'off times' to provide increased voltage over and above the supply voltage. When each magnet has moved away from the center of each coil, the coil driver transistors become conductive at a time determined by the timing wheel to repel both north and south poles of rotor magnets and creating dipolar magnetic compression.

Figure 6:
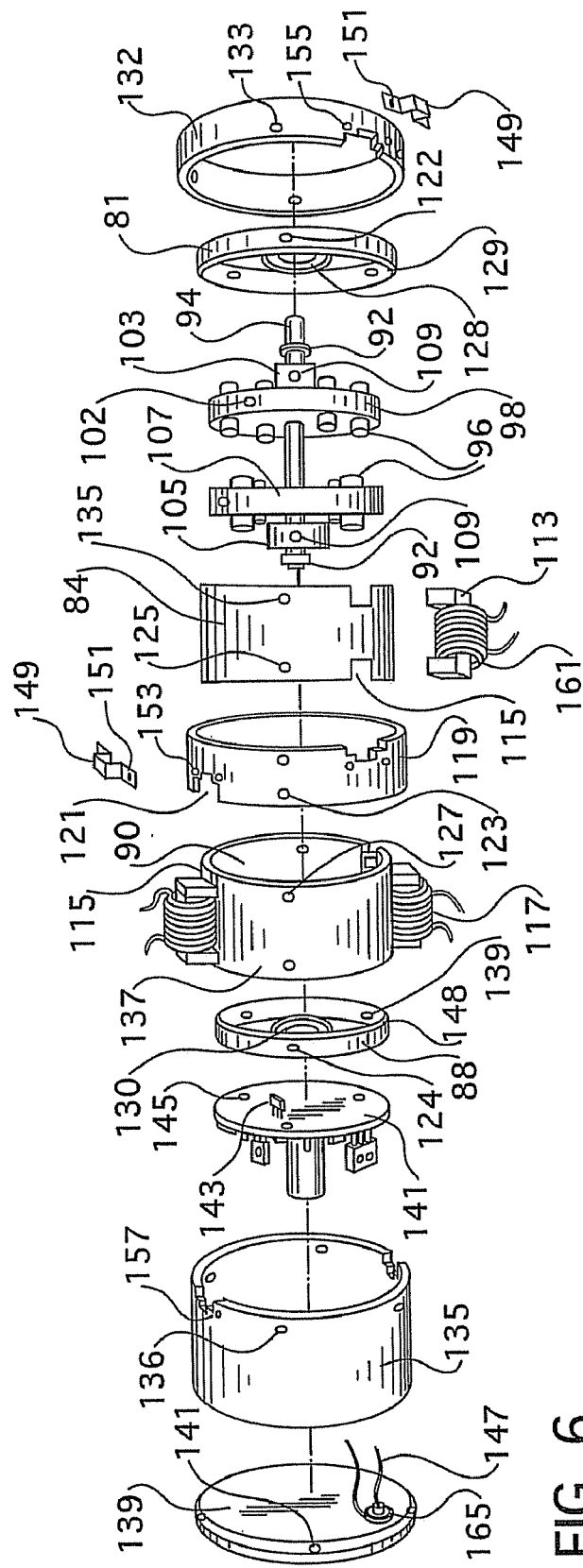
FIG. 6 is an exploded view of a motor of the present invention using two rotors with a plurality of permanent magnets and three coils.
Figure 7:
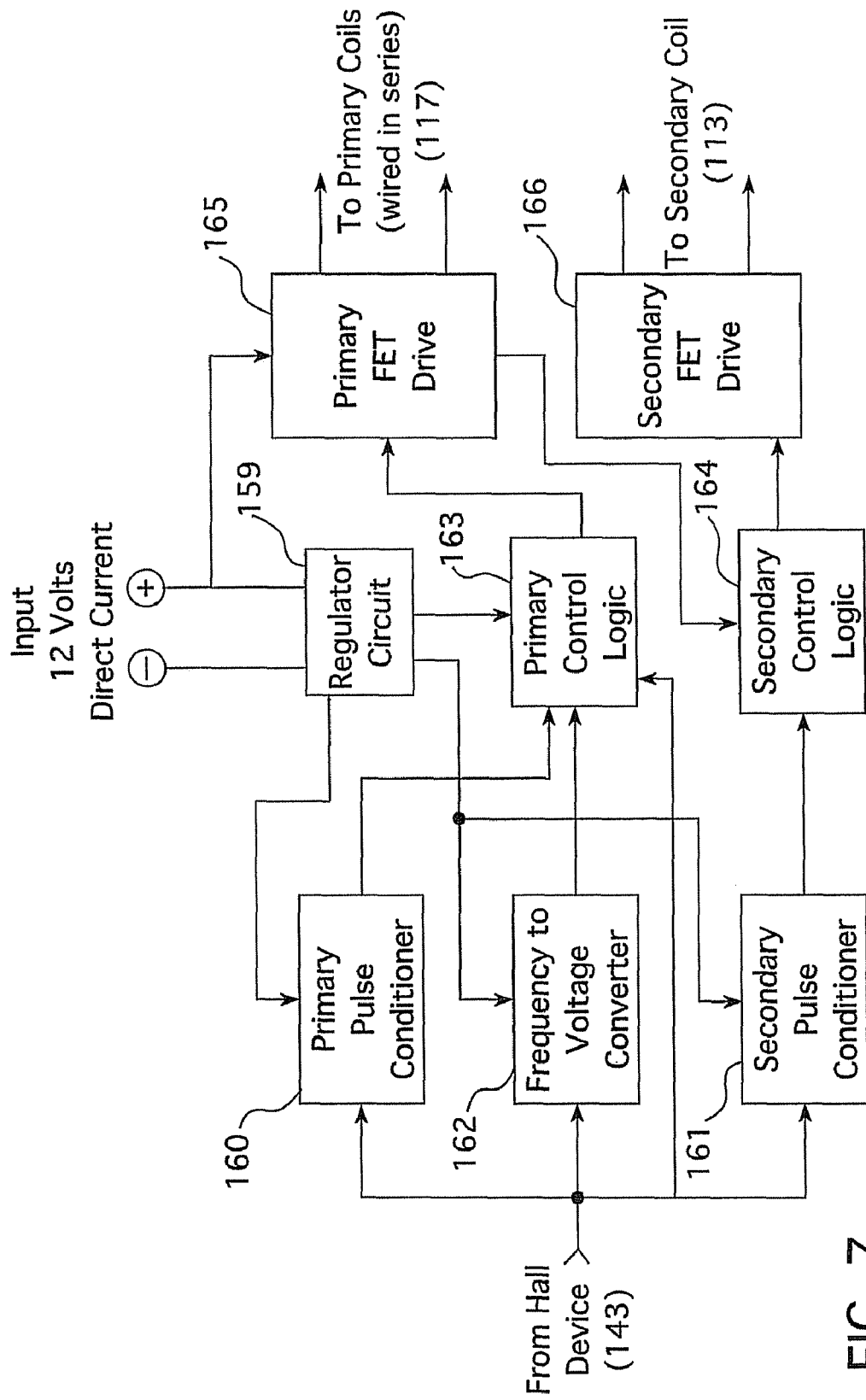
FIG. 7 is a block diagram of a preferred controller used in the motor shown in FIG. 6.
Figure 8:
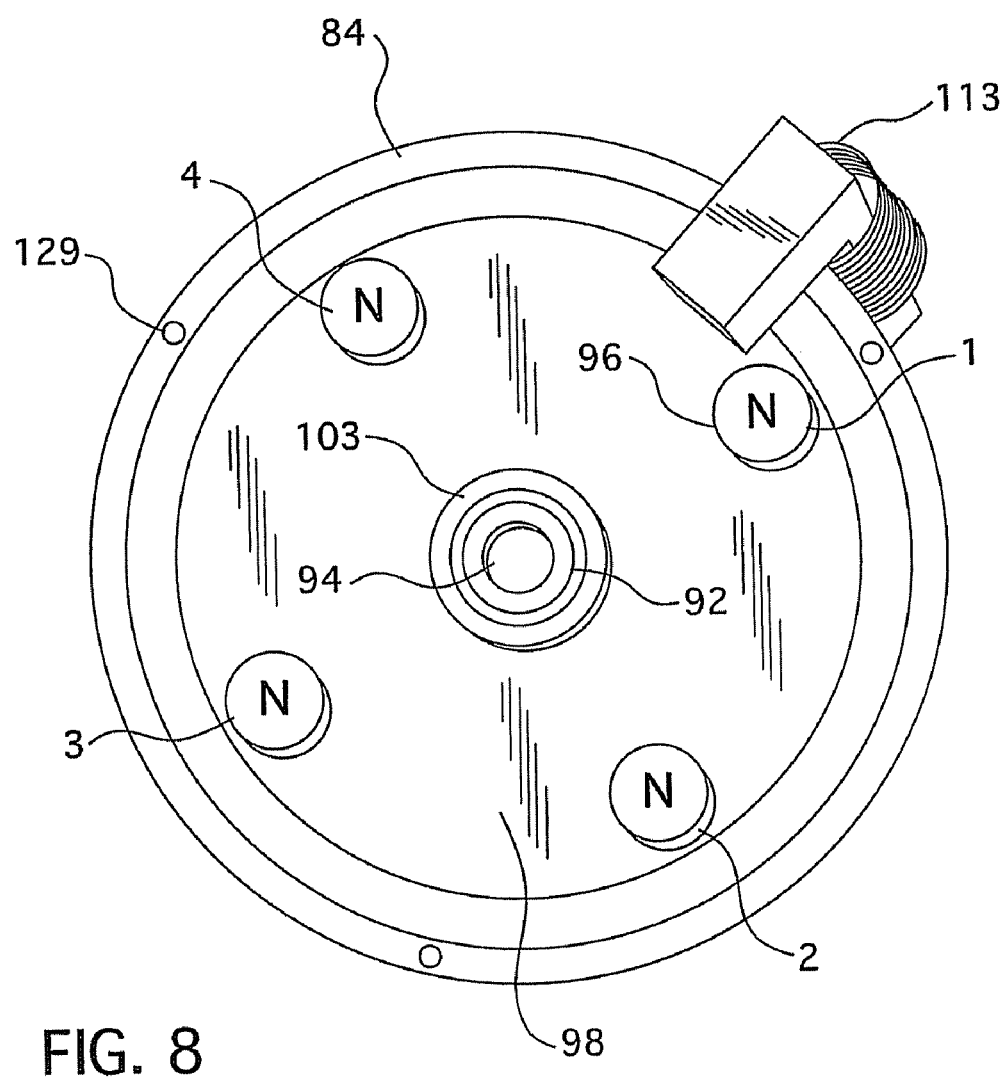
FIG. 8 is an isometric view of the first rotor of the motor shown in FIG. 6.
Figure 9:
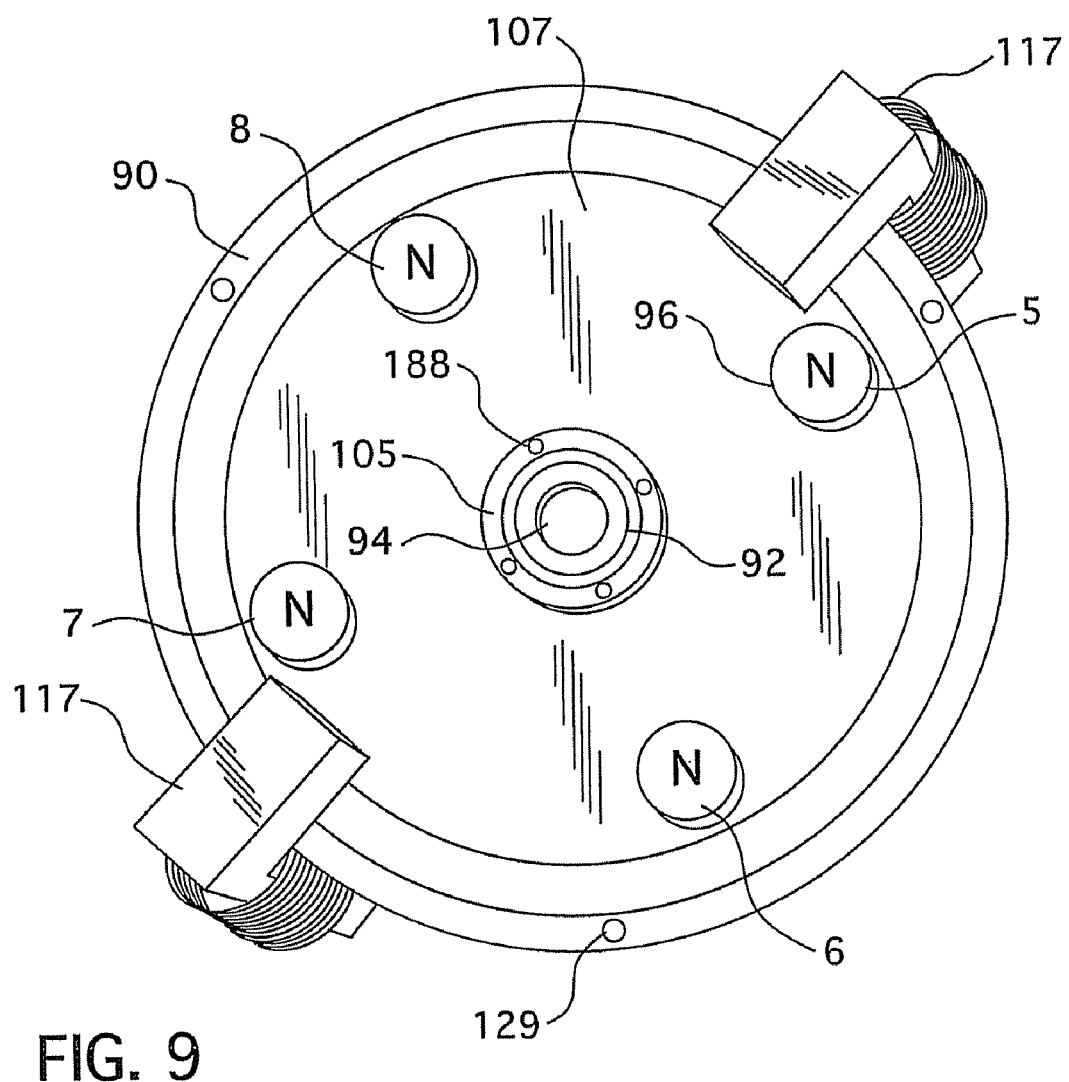
FIG. 9 in is an isometric view of the second rotor of the motor shown in FIG. 6.

In another preferred embodiment of the invention, a dual rotor dipolar magnetic compression motor shown in exploded view FIG. 6. In this embodiment, first and second rotors 98 and 107, respectively, are mounted on drive shaft 94 slightly apart from each other. Drive shaft 94 is mounted to end plates 81 and 88 by means of bearing mounts 128 and 130 secured to the respect end plate. As shown in FIG. 6, four equi-spaced, axially aligned nickel-plated Neodymium cylinder magnets 96 are positioned on each of the respective rotors substantially parallel to shaft 94. Shaft spacer 103 is positioned on shaft between first bearing and first rotor 98. The magnetic polarities of the first and second rotor magnets 96 are positioned to face same magnetic poles opposite from each other.

Timing wheel 105 is positioned on shaft 94 between second rotor 107 and second bearing 130 and secured to shaft by way of two stainless steel set screws 109 placed one hundred eighty-degrees apart to rotate with the shaft 94.

Figure 10:
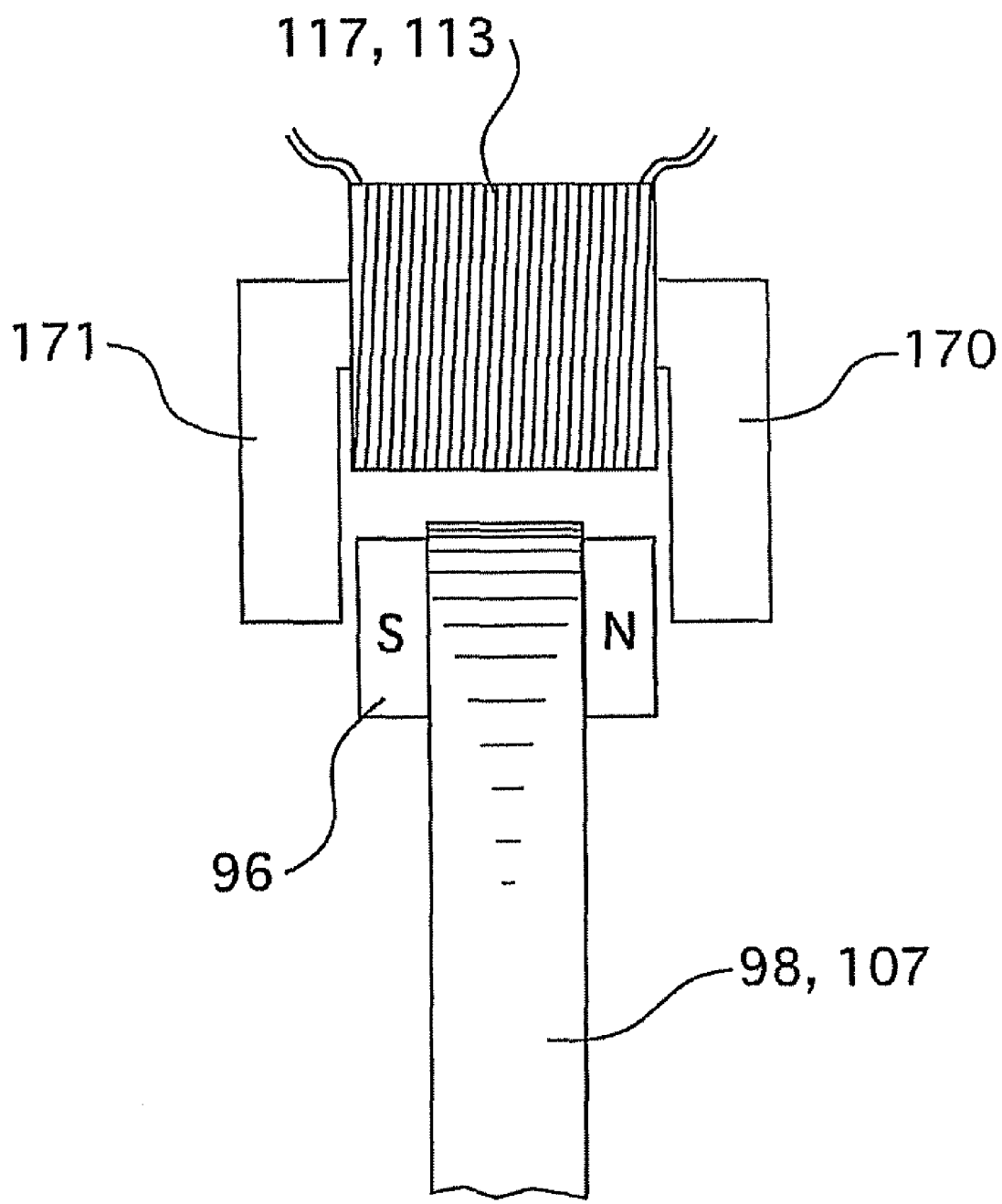
FIG. 10 is a depiction of the U-core coil in relationship to rotor magnet of the present invention.
Figure 11:
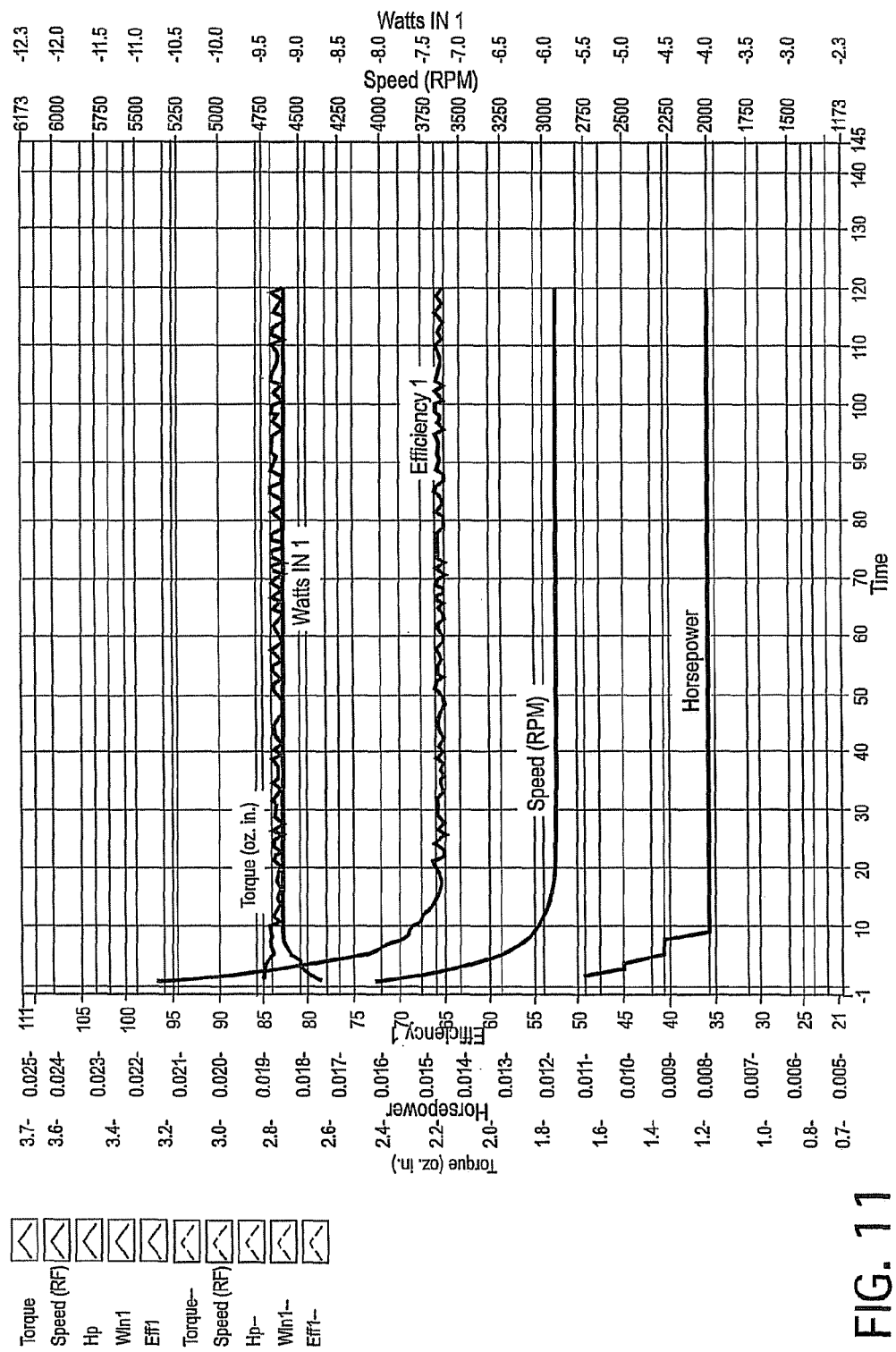
FIG. 11 is a graphical presentation of the dynamometer performance tests of the dual rotor motor shown in FIG. 6.
Figure 12:
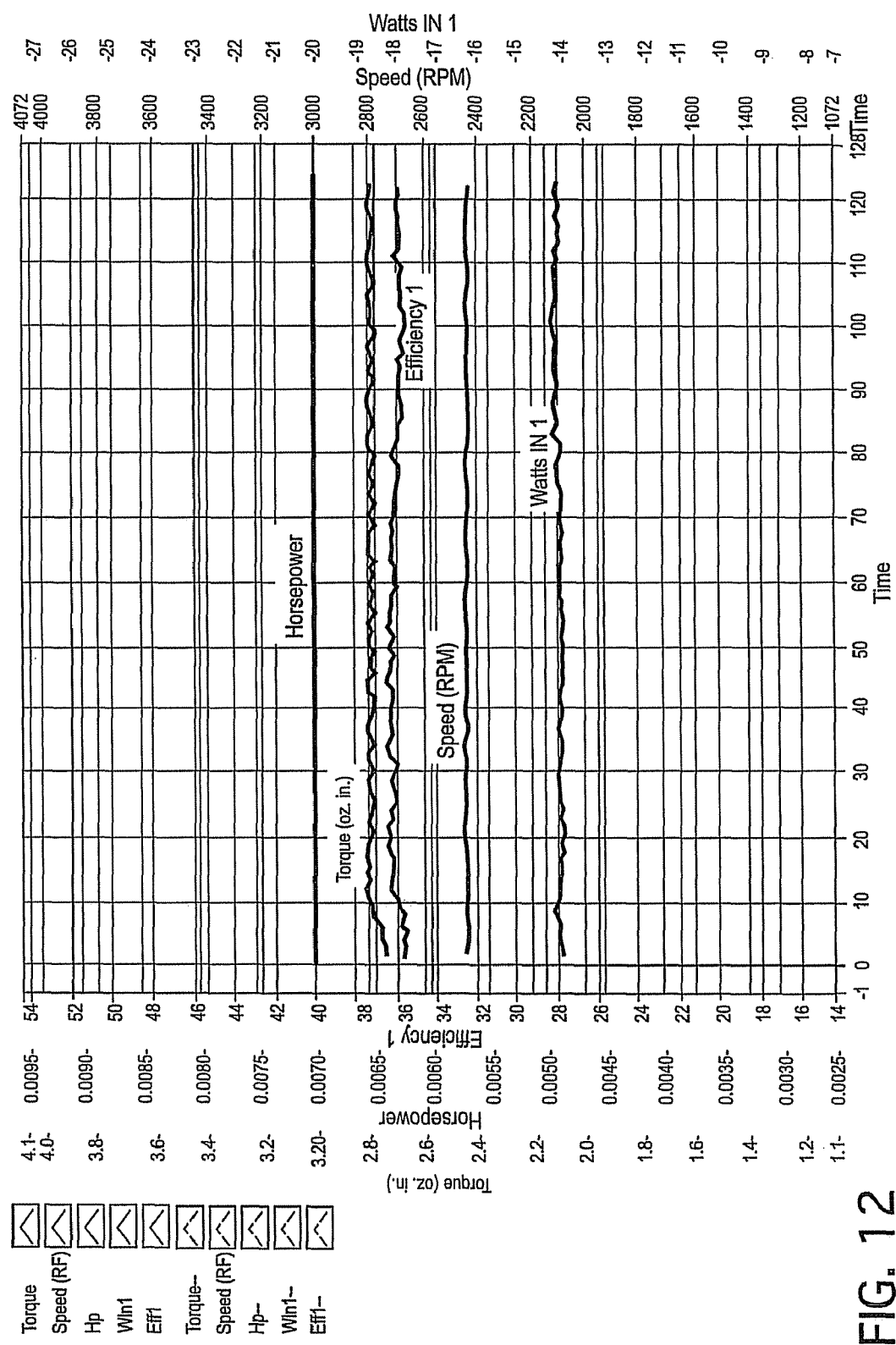
FIG. 12 is a graphical presentation of the dynamometer performance tests of a commercially available conventional do motor.
Figure 13:
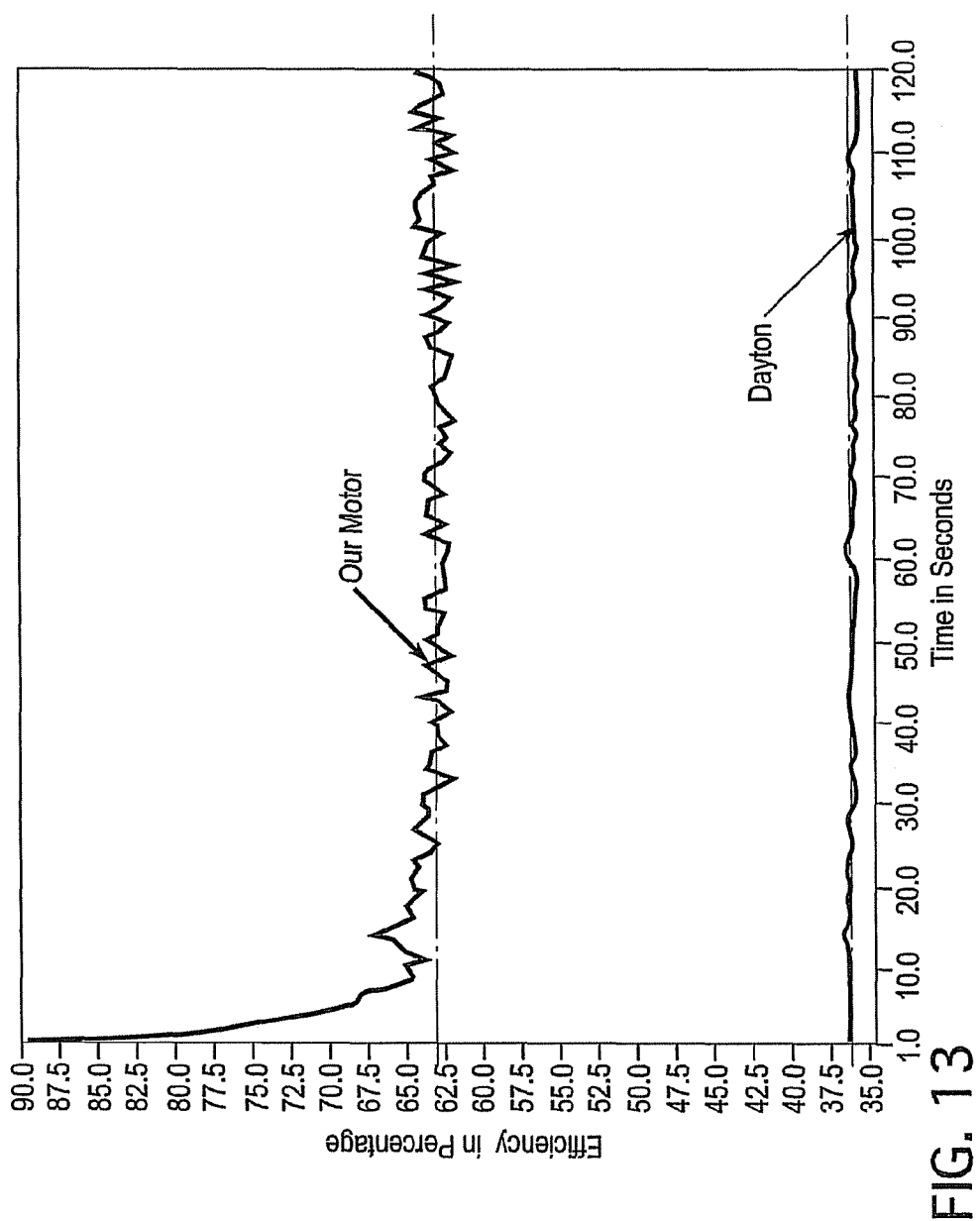
FIG. 13 is a graphical comparison of the efficiency of the motor shown in FIG. 6 and a commercially available motor represented in FIG. 12.

A first coil 113 was fabricated from a length of, e.g., #23 hard-drawn copper enameled wire tightly wound around a "U"-shaped laminated electrical steel core consisting of approximately thirty layers of 0.016" thick, C4 coated enameled sheets. (See, FIG. 10). First coil 113 is mounted through slots 115 in first inner housing, parallel to shaft and first rotor magnets 96. Likewise, two second "U"-shaped coils 117, identical to the first "U"-shaped coil, except wound with a pre-determined length of, e.g., #20 hard-drawn copper enameled wire, are both mounted through slots 115 cut into second inner housing one hundred eighty-degrees apart and wired as a series circuit.

Both first and second inner housings are fixed together by center fixing ring 119. Notches 121 cut into opposing sides of center fixing ring accommodate and hold one side of first "U"-shaped coil core and one side each of both second coil cores in position. Center fixing ring 119 is held into place by stainless steel screws through outer fixing ring holes 123 and into first inner housing 84.

First support plate is pressed into outer side of first inner housing and fixed into place with four stainless steel machine screws through support plate fixing holes 129, each located ninety-degrees apart and into four threaded holes around the outer circumference of first inner housing 84. First bearing, of which supports one end of shaft, first and second rotors spacer and the timing wheel is fixed into centered hole of first support plate 128. Likewise, a second bearing is fixed into second support plate 130. Second support plate 88 is pressed into outer side of second inner housing and fixed into place on second support plate support plate fixing holes 148, each located about ninety-degrees apart and into four threaded holes around the outer circumference of second inner housing 159. First outer housing 132 is fixed into position by machine screws through holes 133, into threaded fixing holes 122. Likewise, second outer housing 90 is secured in position by stainless steel machine screws through holes 137 and into four threaded fixing holes 124. The "U"-shaped coils are securely fixed into position by way of six core mounting brackets 149 held in place with twelve steel machine screws through core mounting bracket mounting holes 151 and into twelve threaded u-core fixing hole, of which six through center fixing ring 153, two through first outer housing 155 and four through second outer housing 157.

Printed circuit board controller 141 is fixed into position on the outer side of second support place by way of brass screws 87 through board mounting holes 145 and into board fixing holes 139 and positioning Hall device 143 to sense location of a position magnet 188 in timing wheel and wires 161 from coils to be attached. Second outer housing 135 is fixed into place over second inner housing by stainless steel machine screws through second outer housing fixing holes 136 drilled 90 degrees apart and into threaded second inner housing fixing holes 137. Additionally, first outer housing is fixed into place over first inner housing by machine screws through first outer housing fixing holes 133 positioned ninety-degrees apart and into threaded first inner housing fixing holes 135. End cap 139 is pressed into outer side of second outer housing and secured with stainless steel machine screws through end cap mounting holes 141 drilled ninety-degrees apart and into threaded second outer housing end cap mounting holes 146.

Input power to printed circuit board is made through power connector 165 and power wires 147.

Circuit Description

Figure 15:
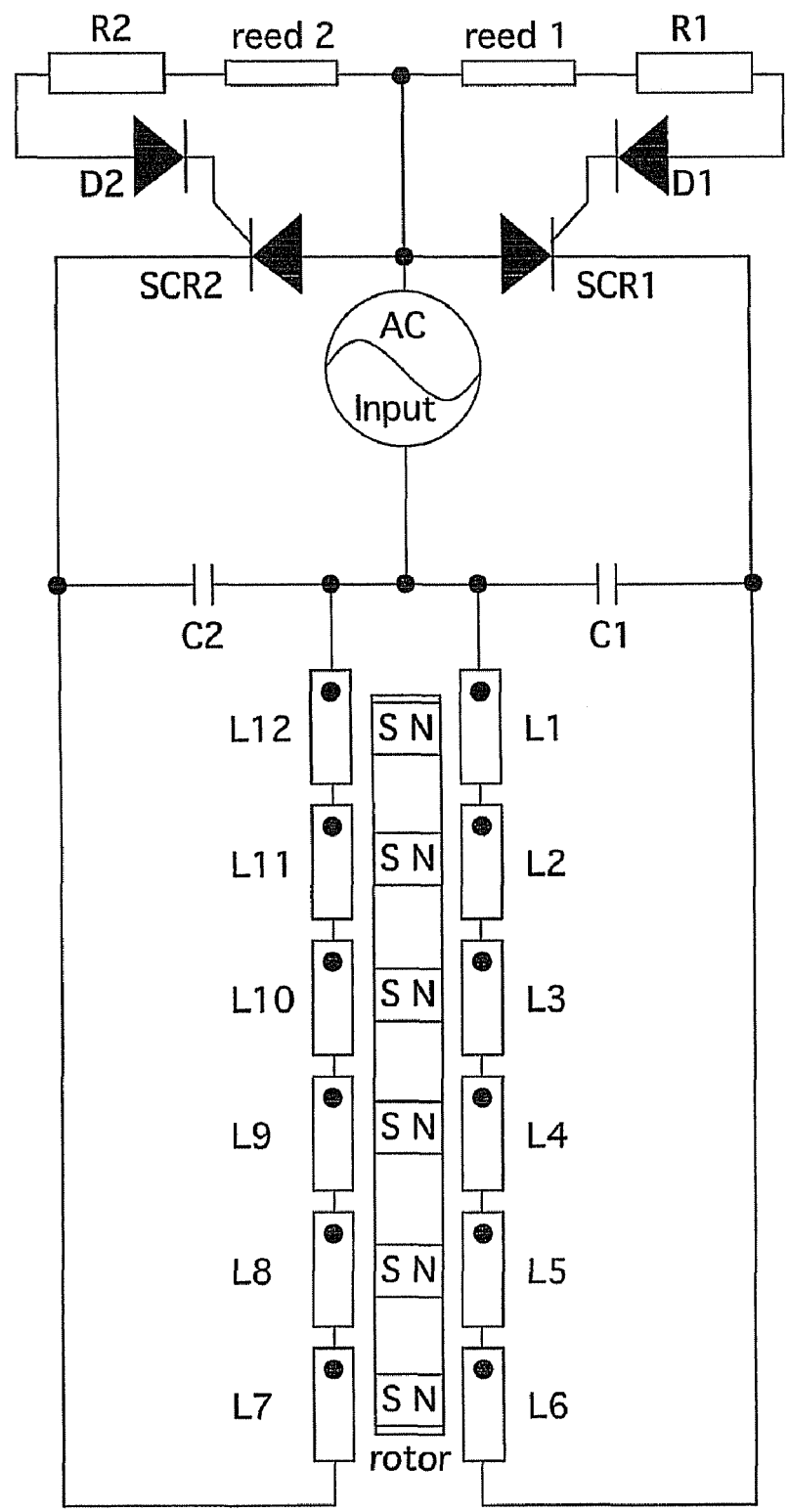
FIG. 15 is a schematic representation of another embodiment of the invention utilizing an ac input current with motor similar that of FIG. 1.

Referring to FIGS. 4, 5, 6, 7, 8, 9 and 10, low voltage regulation is accomplished by connecting input power from a DC power source to regulator circuit 159 to provide 5 volts of regulated power to: Hall device 143, primary pulse conditioner 160, secondary pulse conditioner 161, frequency to voltage converter 162, primary control logic 163 and secondary control logic 164 circuits. Primary coils 117 are fixed in a parallel position with respect to second rotor magnets 107, 96, whereby each magnet's north pole and south pole are simultaneously positioned within close proximity to each primary coil core leg's north 170 and south 171 pole, respectively (FIG. 15). Likewise, secondary coil 113 is fixed into a parallel position to first rotor magnets 98, 96 with each magnet's north and south poles simultaneously positioned within close proximity to secondary coil core leg's north and south poles, respectively.

When input power is applied to regulator 159, control and primary FET drive circuits via circuit board 141 and position actuator magnet 158 in timing wheel 105, Hall device 143 is triggered to output a square wave signal as an input to: primary pulse conditioner 160, secondary pulse conditioner 161, frequency to voltage converter 162, and primary control logic circuits 163. The primary control logic circuit outputs a square wave of a fixed pulse width to primary FET drive circuit 165 to drive current through the primary coils. Current flow through the primary coils creates electromagnetic fields which are aligned to be the same polarity as the primary rotor magnets. As a result, primary rotor magnets respond by repelling away from electromagnetic fields generated by the coils' core legs, thus rotating the rotor.

The resulting CEMF from primary coils are directed as input to secondary control logic circuit and outputted to secondary FET circuit 166, driving current through secondary coil, creating an electromagnetic field which is aligned in such a manner as to be the same polarity as the second rotor magnets. As a result of this action, second rotor magnet one responds by repelling away from electromagnetic field create by secondary coil core, thus contributing to an increase in the torque on shaft. First rotor magnets are fixed approximately twenty-five degrees offset from second rotor magnets, but rotor offset may vary in other examples to maintain peak performance.

In the dipolar magnetic compression motors, this cycle repeats when position actuator magnet two's pole comes in close proximity to Hall device. Likewise, rotor rotation continues as each successive position actuator magnet's pole comes within close proximity to Hall device. When shaft rotation reaches a rate pre-determined by frequency to voltage converter circuit, a stable pulse width is inputted to primary control logic for maintaining shaft torque while drawing minimal current from the source, and continues to do so until input power is removed or shaft is loaded beyond available torque.

Referring to FIGS. 15 through 20 a third embodiment of the motor of the present invention is shown. In this embodiment a first mounting plate 251 is affixed to one end of housing 253. A second mounting plate 252, identical to first mounting plate, is affixed to the opposing end of housing 253 in the same manner as first mounting plate, but facing the opposite direction. A first bearing 257 is mounted into the center of first mounting plate to provide support and a low friction surface for shaft 259 to rotate through. First bearing is pressed into a centered mounting hole 261 of first mounting plate for support and is secured into position by a thin layer of cyanoacrylate adhesive. Similarly, a second bearing 258, identical to the first, is fixed into centered mounting hole of second mounting plate 252 in a manner identical to the first. First and second bearings are preferrably flush with the inner edges of both first and second mounting plates.

Figure 16:
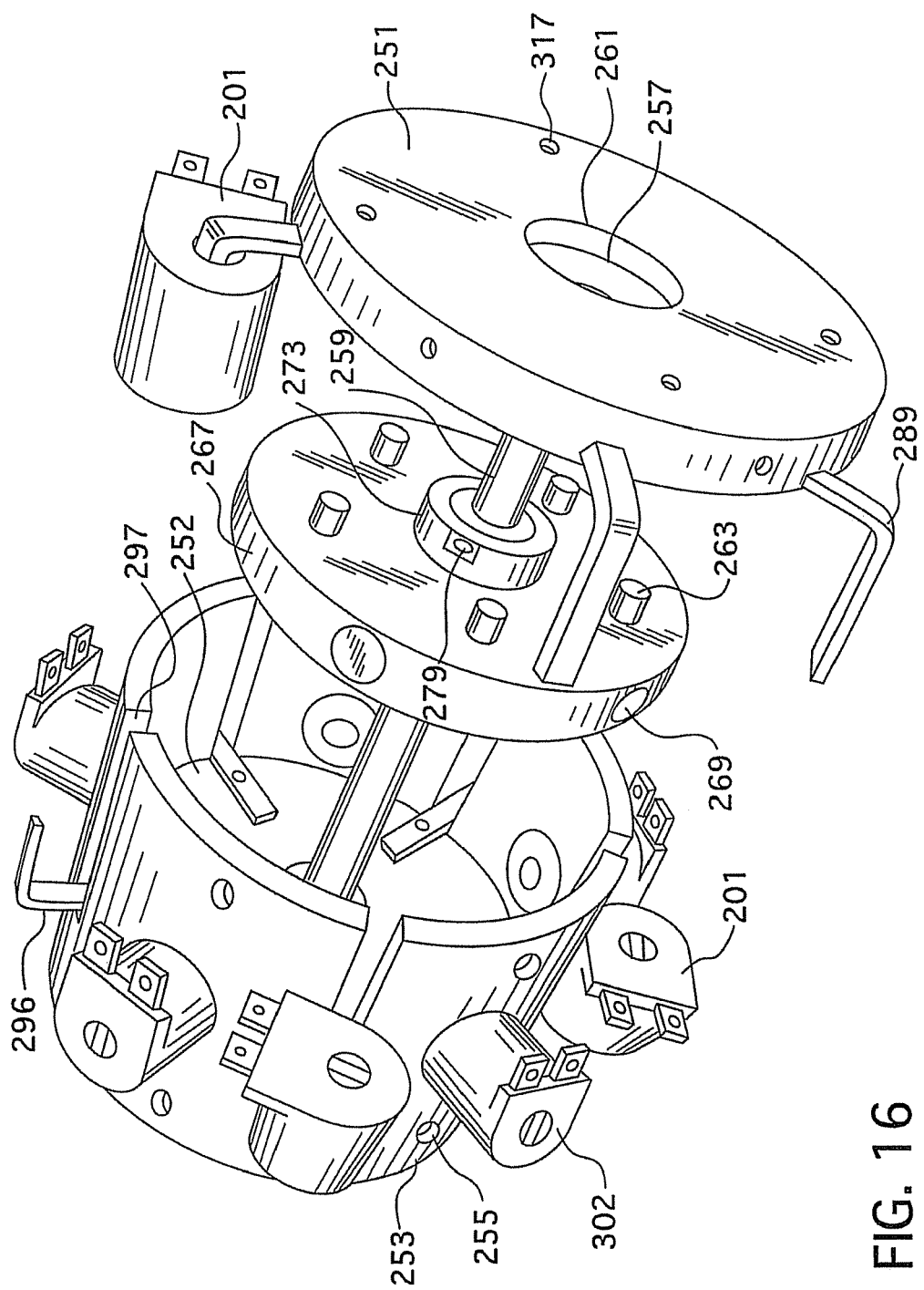
Figure 17:
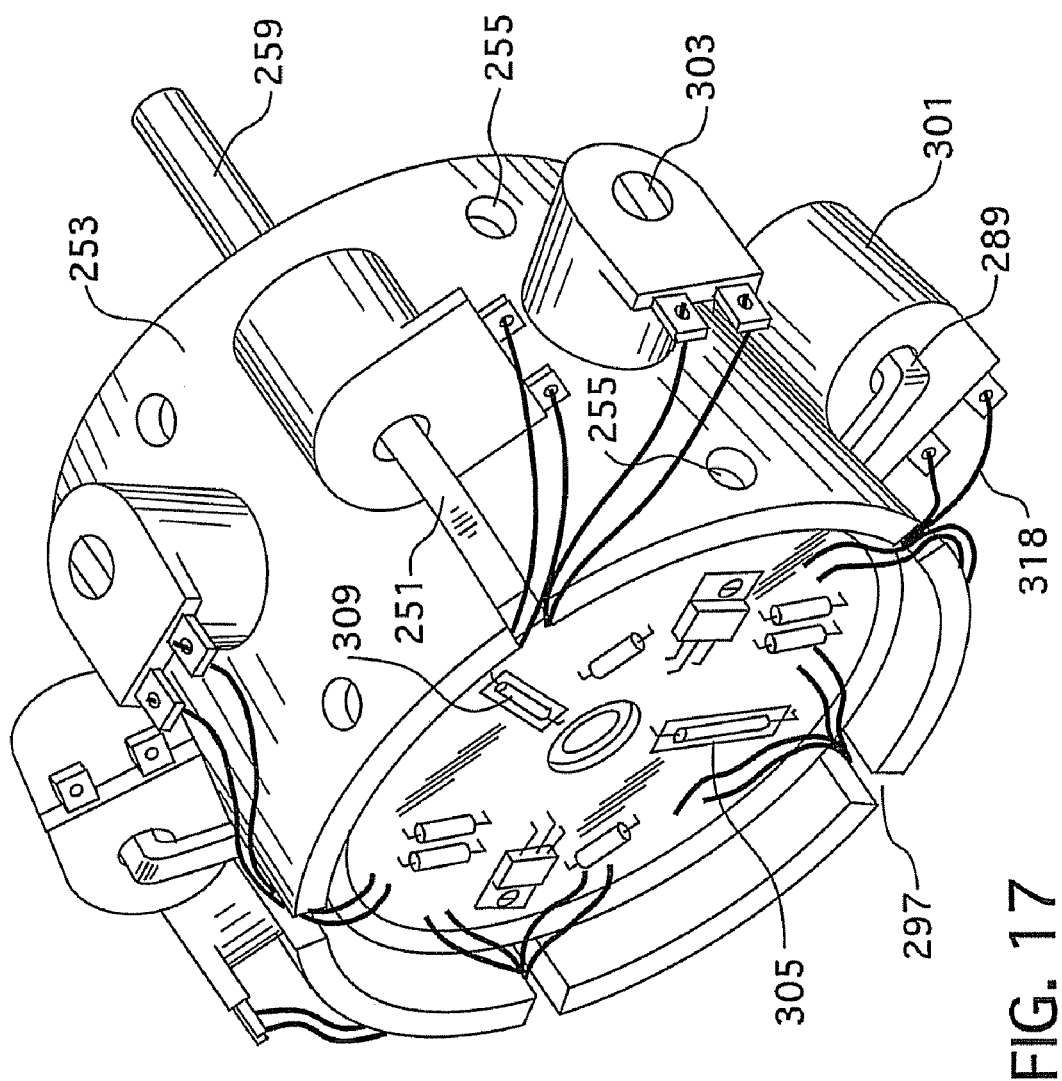
Figure 18:
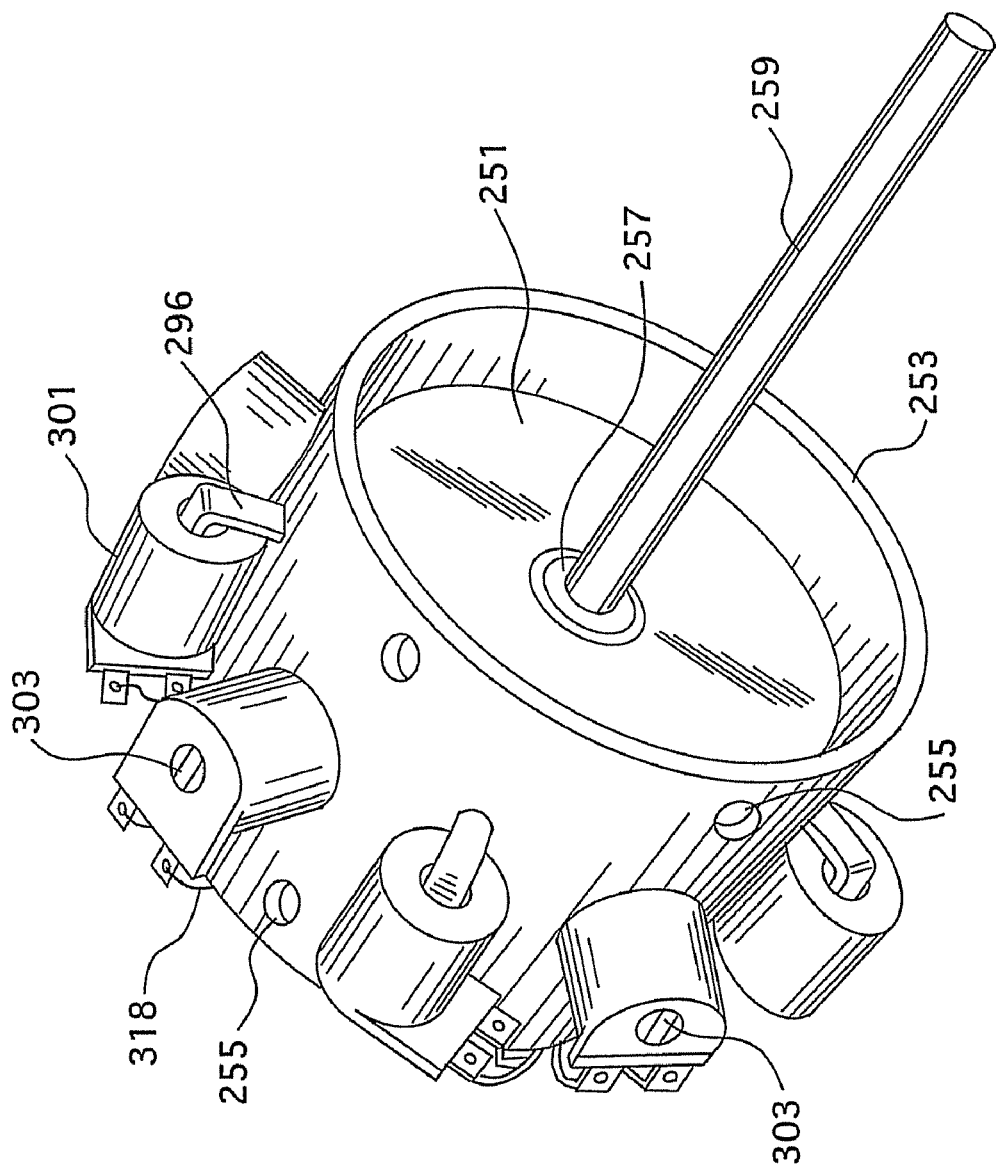

Referring to FIG. 16, five first nickel-plated Neodymium cylinder magnets 263, their magnetic polarities aligned parallel to shaft 259, are pressed into five equally spaced holes around the circumference of rotor 267. Additionally, five second nickel-plated Neodymium disc magnets 269, their magnetic polarities aligned perpendicular to first magnets and shaft 259 are pressed into five second equally spaced openings around the circumference of rotor 267. Shaft 259 passes through center of rotor 267. Rotor 267 is centrally located on and secured to shaft by two identical fixing rings 273, with each fixing ring located on opposite sides of rotor. Each end of the shaft passes through first and second bearings. Each one of five first laminated steel cores 289 are affixed into each of five recessed slots 297 in first mounting plate. Likewise, each of five second laminated steel cores 296 are secure in identical, but opposite handedness in second mounting plate 251, in an identical manner as first laminated steel cores.

Both mounting plates and cores are oriented to face rotor. One each of five first coils with first and second cores are distributed and located in equidistant spaced mounting slots 297 in housing. Each first and second laminated steel cores are positioned in such a manner as to overlap one another within the center of each first coil when assembled. Additionally, each one of five second coils 302 are pressed into 1.045" diameter holes equidistant and centered around the circumference of housing, perpendicular to and equally inter-spaced between each of five first coils.

Figure 19:
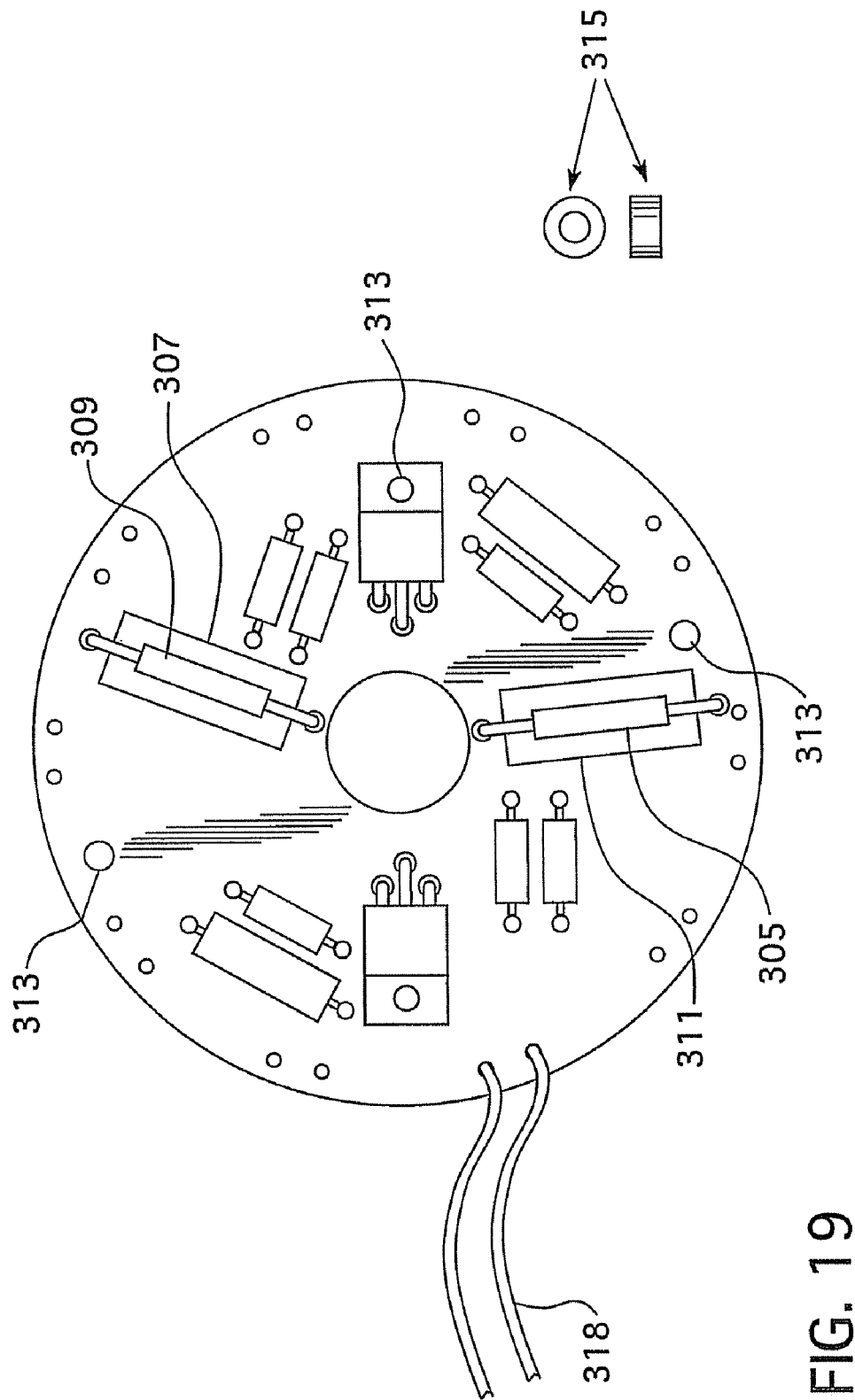
FIG. 19 is a diagrammatic view of the circuit board for the dipolar axial compression motor shown in FIGS. 15 through 18.
Figure 20:
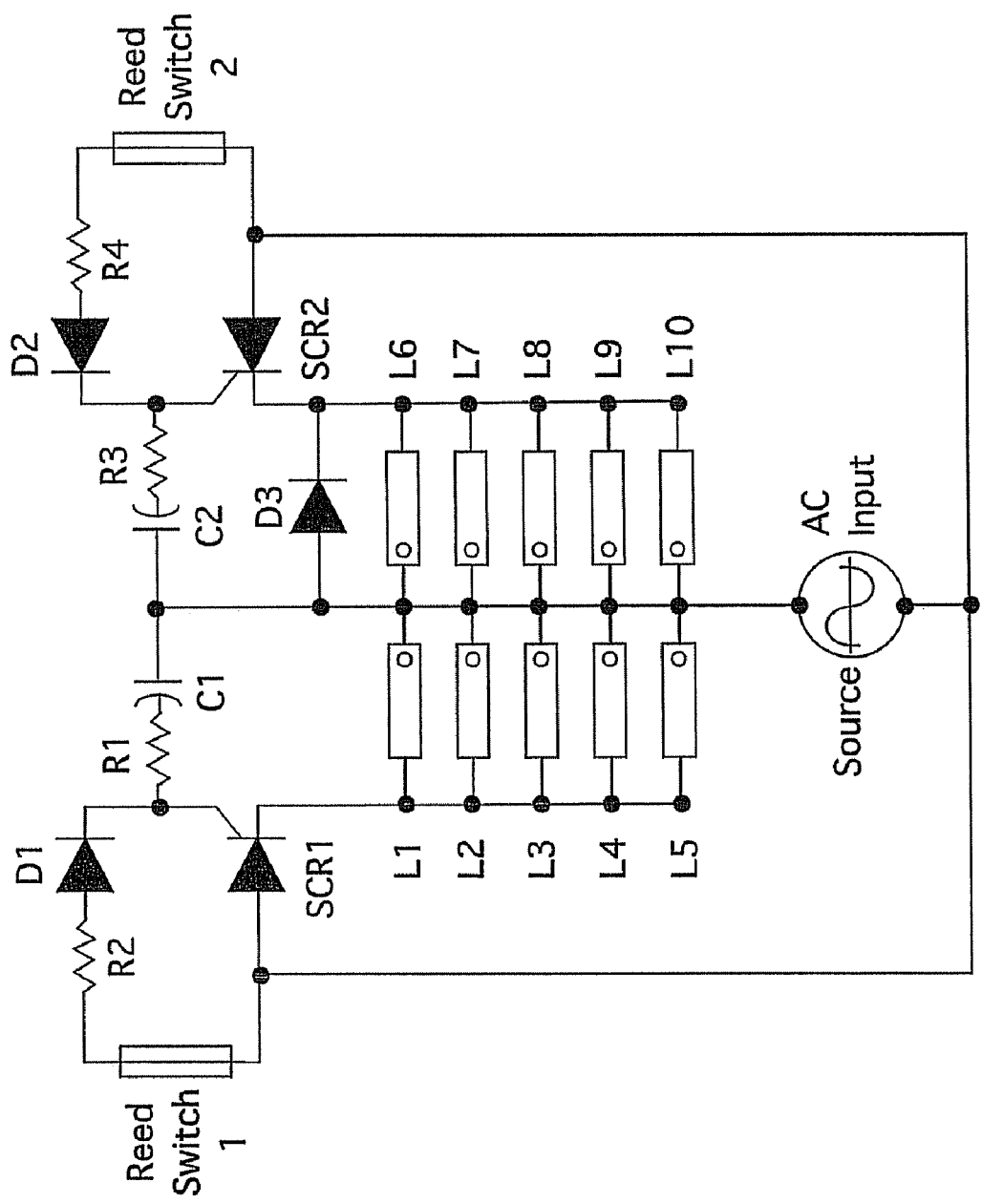
FIG. 20 is a schematic circuit of the motor shown in FIG. 19.

Within each center of said five second coils are fitted a third laminated steel core 303, of which are fixed into position by an ample amount of silicon adhesive to fill in the gap between core and hole. Circuit board FIG. 19 is secured on the outer side of second mounting plate. A first reed switch 305 is accurately positioned across slot 311 to insure proper on-off timing of board. Likewise, second reed switch 309 is accurately positioned across slot 305 to ensure proper on-off timing of SCR2 and soldered onto said circuit board.

Description of Dipolar AC Motor Operation

Figure 15B:
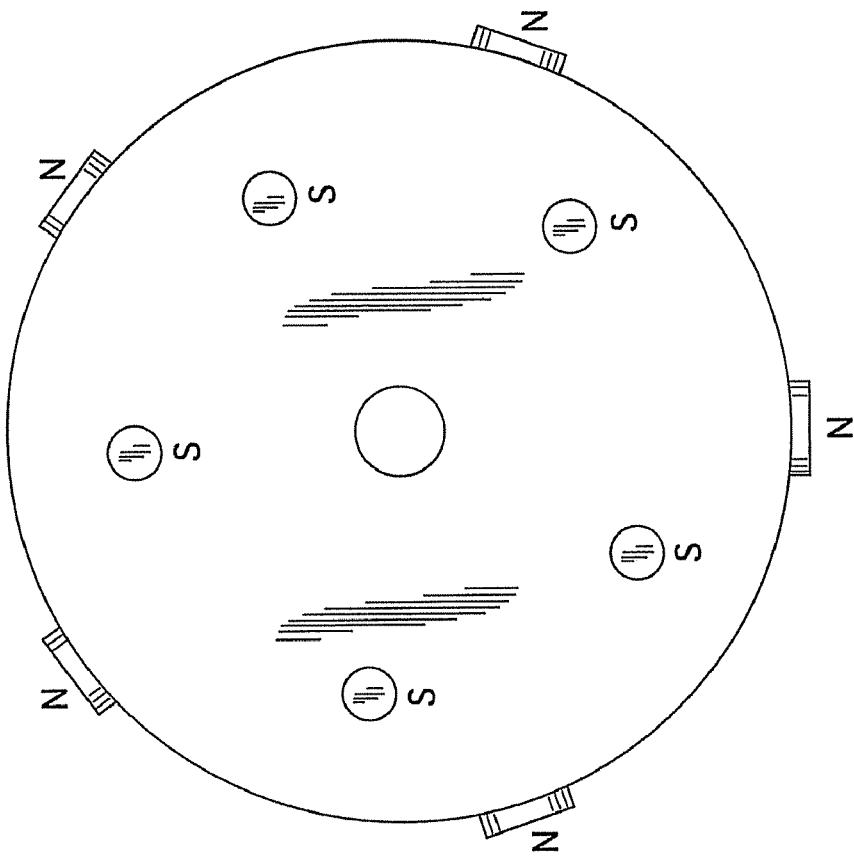
FIGS. 15a and 15b are structural representations of the magnetic/rotor configurations of the embodiment depicted in FIG. 15.
Figure 15A:
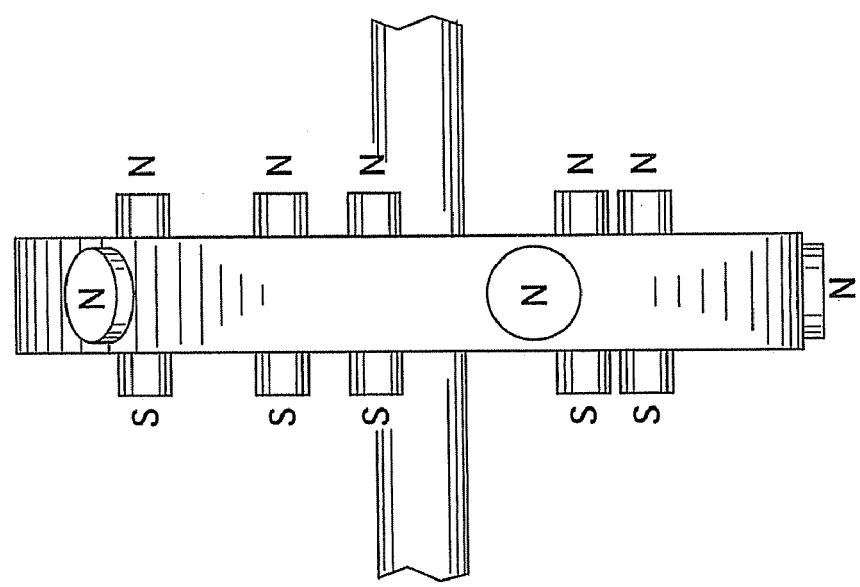

Referring to FIGS. 15 through 20, dipolar motor operation begins by applying an alternating current across the anode terminal of SCR1, SCR2, first and second reed switches and common terminals of coils L1-L10. South pole of a first rotor magnet (FIG. 15b) is positioned within close proximity to first reed switch 305, of which becomes actuated by said first magnets south magnetic field. Output currents from first reed switch pass through first current limiting resistor R2, first polarization diode D1 and into gate terminals of SCR1. Alternating currents flow from the source, into the anode terminal of SCR1 and are output from its cathode terminal at a phase and of a duration determined by first reed switch's on-off time.

Five first coils L1-L5 located in and around the circumference of housing 253 become energized as current flows from SCR1 cathode terminal, through coil connecting wires 318, through first coils and then return to the source, closing the circuit. Currents flowing through first coils create an electromagnetic field of a north polarity and south polarity from both ends of first coils. North polarity electromagnetic fields are coupled via north laminated cores 289 which are in close proximity to north poles of first rotor magnets, of which provide an opposing force against said first magnets north poles, thus repelling rotor along an x-axis. A first capacitor C1 connected in series with first current limiting resistor R1 provides transient storage. Said capacitor and said resistor values chosen to achieve spike elimination for stabilization of SCR1. Simultaneously, south polarity electromagnetic fields are coupled via south laminated cores 95 which are in close proximity to south poles of first rotor magnets, of which provide an opposing force against said first magnets south poles, thus repelling rotor along the same x-axis.

In another operation, south pole of a first rotor magnet 263 is positioned within close proximity to second reed switch 309, of which becomes actuated by said first magnets south magnetic field at a twenty-six degree offset of said first magnet south position. Output currents from said second reed switch pass through second current limiting resistor R4, second polarization diode D2 and into gate terminals of SCR2. Alternating currents flow from the source, into the anode terminal of SCR2 and are output from its cathode terminal at a phase and of a duration determined by second reed switch's on-off time.

Five second coils L6-L10 located in and around the circumference of housing 253 become energized as current flows from SCR2 cathode terminal, through coil connecting wires 318, through second coils and then return to the source, closing the circuit. Currents flowing through second coils create an electromagnetic field of a north polarity and south polarity from both ends of second coils. North polarity electromagnetic fields are not utilized in this example, but may be used in other examples. Counter-electromotive force generated from second coils collapsing fields are suppressed by shunt diode D3. South polarity electromagnetic fields are coupled via laminated cores 303 which are in close proximity to south poles of second rotor magnets, of which provide an opposing force against said second magnets south poles, thus repelling rotor along a y-axis. A second capacitor C2 connected in series with second current limiting resistor R3 provides transient storage. Said capacitor and said resistor values chosen to achieve spike elimination for stabilization of SCR2.

As each successive first magnet rotates into position to actuate first and second reed switches, this cross-axis dipolar method of creating rotational torque continues until source power is disrupted or loading beyond available torque stalls rotor. In this example, an alternating current input of 60 Hz at 115 Volts results in an unloaded shaft rotation of 720 RPM.

Test Data

Test data for the dipolar ac motor of the present invention are shown below.

| driver circuit | Rpm | Input watts | pri coil temp F. | sec coil temp F. | run time M | # coils sec | first spacing | sec spacing | cemf V | pri current A | pri voltage V | sec current A | sec voltage V |
|---|---|---|---|---|---|---|---|---|---|---|---|---|---|
| diode bridge | 600 | 37 | 132 | 132 | 60 | 6 series | 0.5 | 0.5 | none | 0.25 | 109 | 0.25 | 109 |
| scr | 600 | 35 | 121 | | 2 | 0 | 0.5 | none | none | 0.5 | 115 | | |
| scr | 600 | 33 | 120 | | 2 | 0 | 0.375 | none | none | 0.51 | 115 | | |
| scr | 600 | 31 | 118 | | 2 | 0 | 0.1875 | none | none | 0.48 | 115 | | |
| scr | 600 | 29 | 113 | | 2 | 0 | 0.125 | none | none | 0.46 | 115 | | |
| scr | 600 | 72 | 142 | 142 | 30 | 6 series | 0.25 | 0.25 | none | 0.5 | 125 | 0.5 | 125 |
| scr | 600 | 50 | 150 | 150 | 60 | 6 series | 0.25 | 0.25 | none | 0.425 | 123 | 0.425 | 123 |
| scr | 600 | 80 | 150 | 150 | 60 | 6 series | 0.25 | 0.25 | none | 0.5 | 120 | 0.5 | 120 |
| scr | 600 | 80 | 150 | 150 | 60 | 6 series | 0.25 | 0.25 | 124 no load | 0.5 | 120 | 0.5 | 120 |

While presently preferred embodiments of the invention have been shown and described, it may otherwise be embodied within the scope of the claims.

The invention claimed is:

1. A dipolar magnetic compression motor comprising,
   a. a shaft;
   b. at least one first nonferrous rotor mounted to shaft;
   c. at least two spaced apart permanent magnets mounted through the rotor substantially parallel to the shaft with like poles adapted for dipolar alignment;
   d. a support member concentrically positioned around the rotor;
   e. at least two spaced apart substantially ferrous-cored coils mounted to the support member and having like poles juxtaposed to the permanent magnets for dipolar alignment during rotation of the shaft, each of said coils having a winding for receiving both an input current from a control circuit and an induced current from a permanent magnet as it begins to exit during rotation from its dipolar alignment;
   f. a timing wheel positioned on the shaft adjacent to the support member and including a Hall effect device;
   g. a control circuit connected to the motor for controlling an intermittent current to respective coils when activated by the timing wheel, the control circuit having a circuit for receiving current from at least one of the coils during rotation of the rotor when at least one of the coils is not directing current from said control circuit, said received current being directed to said control circuit for application to another one of the coils receiving current from said control circuit; and
   h. a housing for supporting said shaft and support member.

2. A dipolar magnetic compression motor as set forth in claim 1 wherein each of the coils comprises a substantially "U" shaped core.

3. A dipolar magnetic compression motor as set forth in claim 2 wherein the rotor includes at least two permanent magnets.

4. A dipolar magnetic compression motor as set forth in claim 2 including a second rotor having the at least two permanent magnets as the first rotor, the magnetic poles of inner magnet faces being of the same polarity.

5. A dipolar magnetic compression motor as set forth in claim 1 wherein the rotor includes at least two permanent magnets.

6. A dipolar magnetic compression motor as set forth in claim 1 wherein the housing is cylindrical and nonferrous.

7. A dipolar magnetic compression motor as set forth in claim 1 wherein the control circuit controls a dc current.

8. A dipolar magnetic compression motor as set forth in claim 1 wherein the control circuit controls an ac current.

* * * * *

UNITED STATES PATENT AND TRADEMARK OFFICE
CERTIFICATE OF CORRECTION

PATENT NO. : 8,138,696 B2  Page 1 of 1
APPLICATION NO. : 12/975652
DATED : March 20, 2012
INVENTOR(S) : Timm A. Vanderelli et al.

It is certified that error appears in the above-identified patent and that said Letters Patent is hereby corrected as shown below:

Title Page

(75) Inventors:

"Rodney Carter" should read "Rodney A. Carter"

Signed and Sealed this
Tenth Day of July, 2012

David J. Kappos
*Director of the United States Patent and Trademark Office*